United States Patent
Kenney et al.

(10) Patent No.: US 10,284,346 B2
(45) Date of Patent: May 7, 2019

(54) SYSTEMS AND METHODS FOR SIGNAL CLASSIFICATION

(71) Applicant: Intel Corporation, Santa Clara, CA (US)

(72) Inventors: Thomas J. Kenney, Portland, OR (US); Eldad Perahia, Portland, OR (US); Shahrnaz Azizi, Cupertino, CA (US); Robert Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 37 days.

(21) Appl. No.: 15/452,771

(22) Filed: Mar. 8, 2017

(65) Prior Publication Data

US 2017/0230157 A1    Aug. 10, 2017

Related U.S. Application Data

(63) Continuation of application No. 14/581,966, filed on Dec. 23, 2014.

(Continued)

(51) Int. Cl.
*H04L 5/00* (2006.01)
*H04L 29/06* (2006.01)
(Continued)

(52) U.S. Cl.
CPC ......... *H04L 5/0048* (2013.01); *H04B 7/0413* (2013.01); *H04L 27/0012* (2013.01);
(Continued)

(58) Field of Classification Search
CPC .............................. H04L 5/0048; H04L 27/20
See application file for complete search history.

(56) References Cited

U.S. PATENT DOCUMENTS

| 7,450,489 B2 * | 11/2008 | Sandhu | H04L 5/0048 370/204 |
| 9,167,476 B2 * | 10/2015 | Kim | H04W 4/06 |

(Continued)

FOREIGN PATENT DOCUMENTS

| JP | 2013511221 A | 3/2013 |
| KR | 20120081040 A | 7/2012 |

(Continued)

OTHER PUBLICATIONS

Extended European Search Report for EP Application No. 15848410.5 dated May 14, 2018, 11 pages.

(Continued)

*Primary Examiner* — Parth Patel
(74) *Attorney, Agent, or Firm* — Alliance IP, LLC

(57) ABSTRACT

This disclosure describes systems, and methods related to signal classification in a wireless communication network. A first computing device comprising one or more processors and one or more transceiver component may receive a signal transmission packet comprising a physical layer (PHY) preamble. The first computing device may identify within the PHY preamble, one or more signal (SIG) fields, wherein at least one of the one or more SIG fields includes at least a length field indicating a length of the signal transmission packet. The first computing device may determine based at least in part on the length field, that the signal transmission packet is associated with a predetermined communication standard utilized to transmit the signal transmission packet. The first computing device may decode the signal transmission packet based at least in part on the determination that the signal transmission packet is associated with the predetermined communication standard.

38 Claims, 8 Drawing Sheets

Related U.S. Application Data

(60) Provisional application No. 62/061,645, filed on Oct. 8, 2014.

(51) Int. Cl.

| | | |
|---|---|---|
| *H04W 72/04* | (2009.01) | |
| *H04L 27/00* | (2006.01) | |
| *H04B 7/0413* | (2017.01) | |
| *H04L 27/20* | (2006.01) | |
| *H04W 84/12* | (2009.01) | |

(52) U.S. Cl.
CPC .............. *H04L 27/20* (2013.01); *H04L 69/22* (2013.01); *H04W 72/0453* (2013.01); *H04W 84/12* (2013.01); *H04L 5/0023* (2013.01); *H04L 27/2035* (2013.01)

(56) References Cited

U.S. PATENT DOCUMENTS

| | | | |
|---|---|---|---|
| 9,445,306 B2 | 9/2016 | Kim et al. | |
| 9,699,727 B2* | 7/2017 | Kenney | H04W 52/0212 |
| 2008/0049601 A1* | 2/2008 | Tzannes | H04L 1/0028 |
| | | | 370/208 |
| 2008/0109711 A1* | 5/2008 | Morioka | H04L 1/0063 |
| | | | 714/807 |
| 2009/0005091 A1* | 1/2009 | Takahashi | H04B 7/0413 |
| | | | 455/500 |
| 2010/0054368 A1* | 3/2010 | Feng | H04L 27/2647 |
| | | | 375/340 |
| 2010/0091673 A1* | 4/2010 | Sawai | H04L 5/0053 |
| | | | 370/252 |
| 2010/0107042 A1* | 4/2010 | Sawai | H04L 27/2655 |
| | | | 714/799 |
| 2010/0260159 A1 | 10/2010 | Zhang et al. | |
| 2011/0032875 A1* | 2/2011 | Erceg | H04B 7/0452 |
| | | | 370/328 |
| 2011/0096685 A1* | 4/2011 | Lee | H04L 27/0012 |
| | | | 370/252 |
| 2012/0201196 A1 | 8/2012 | Merlin et al. | |
| 2013/0128807 A1* | 5/2013 | Vermani | H04L 5/0053 |
| | | | 370/328 |
| 2014/0211775 A1 | 7/2014 | Sampath et al. | |
| 2014/0307612 A1* | 10/2014 | Vermani | H04L 5/0044 |
| | | | 370/312 |
| 2014/0362935 A1* | 12/2014 | Porat | H04L 27/2602 |
| | | | 375/260 |
| 2014/0369276 A1* | 12/2014 | Porat | H04L 5/003 |
| | | | 370/329 |
| 2015/0009894 A1* | 1/2015 | Vermani | H04L 1/0072 |
| | | | 370/328 |
| 2015/0071372 A1* | 3/2015 | Zhang | H04L 27/2602 |
| | | | 375/295 |
| 2015/0098447 A1* | 4/2015 | Kim | H04W 74/00 |
| | | | 370/331 |
| 2015/0117227 A1* | 4/2015 | Zhang | H04L 1/0057 |
| | | | 370/245 |
| 2015/0117433 A1* | 4/2015 | Zhang | H04L 69/22 |
| | | | 370/338 |
| 2015/0139205 A1* | 5/2015 | Kenney | H04W 52/241 |
| | | | 370/338 |
| 2015/0146653 A1* | 5/2015 | Zhang | H04L 5/0041 |
| | | | 370/329 |
| 2015/0257106 A1* | 9/2015 | Mujtaba | H04W 52/0238 |
| | | | 370/311 |
| 2015/0304078 A1* | 10/2015 | Cao | H04B 7/12 |
| | | | 370/203 |
| 2015/0319782 A1* | 11/2015 | Chu | H04W 74/08 |
| | | | 370/336 |
| 2016/0105535 A1* | 4/2016 | Kenney | H04L 69/22 |
| | | | 370/329 |
| 2016/0127948 A1* | 5/2016 | Azizi | H04L 27/2613 |
| | | | 370/338 |
| 2017/0019916 A1* | 1/2017 | Azizi | H04W 72/1278 |
| 2017/0208153 A1* | 7/2017 | Li | H04L 1/00 |

FOREIGN PATENT DOCUMENTS

| | | |
|---|---|---|
| KR | 20140034829 A | 3/2014 |
| RU | 2519056 C2 | 6/2014 |
| RU | 2528143 C2 | 9/2014 |
| WO | 2006071679 A2 | 7/2006 |
| WO | 2013028216 A1 | 2/2013 |
| WO | 2013154405 A1 | 10/2013 |
| WO | 2014123357 A1 | 8/2014 |

OTHER PUBLICATIONS

Russian Search Report for RU Application No. 2017107263 dated Apr. 18, 2018, 2 pages.
International Search Report and Written Opinion dated Dec. 22, 2015 in International Application No. PCT/US2015/048870, 13 pages.
Notice of Allowance issued by Intellectual Property Office Ministry of Economic Affairs for Application No. 104129373 dated May 25, 2017; English translation provided.
Search Report for Taiwanese Patent Application No. 104129373 completed Oct. 5, 2016; 2 pages (1 page translation of Search Report).
USPTO Final Office Action issued in U.S. Appl. No. 14/581,966 dated Dec. 12, 2016; 18 pages.
USPTO Non-Final Office Action issued in U.S. Appl. No. 14/581,966 dated Jul. 15, 2016; 20 pages.
International Preliminary Report on Patentability in International Application No. PCT/US2015/048870, dated Apr. 11, 2017, 9 pages.
KIPO Notice of preliminary Rejection issued in KR Patent Application No. 2017-7006439 dated Jul. 31, 2018 (6 pages) with English translation (5 pages).
Notice of Allowance for Japanese Patent Application No. 2107-514517 dated Apr. 4, 2018, 3 pages.
Rohde and Schwarz, 802.11ac Technology Introduction White Paper (https://cdn.rohde-schwarz.com/), Mar. 2012, 29 pages.
Seok, Y et al., HEW PPDU Format for Supporting MIMO-OFDMA, IEEE 802.11-14/1210r1, Sep. 14, 2014, 16 pgs.
Zhang, H., et al., 802.11zx Preamble Design and Auto-detection, IEEE 802.11-15/0579, Jul. 10, 2015, 35 pages.
KIPO, Notice of Final Rejection issued for Korean Patent Application No. 2017-7006439, dated Feb. 27, 2019; 7 pages.

\* cited by examiner

SYSTEMS AND METHODS FOR SIGNAL CLASSIFICATION

CROSS-REFERENCE TO RELATED APPLICATIONS

This application is a continuation (and claims the benefit of priority under 36 U.S.C. § 120) of U.S. application Ser. No. 14/581,966, filed Dec. 23, 2014, entitled "SYSTEMS AND METHODS FOR SIGNAL CLASSIFICATION," Inventors Thomas J. Kenney et al., which claims the benefit of U.S. Provisional Application No. 62/061,645, filed Oct. 8, 2014, the disclosure of which are incorporated herein by reference.

TECHNICAL FIELD

This disclosure generally relates to systems and methods for wireless communications and, more particularly, to signal classification in a wireless communication network.

BACKGROUND

Wi-Fi network performance is an important factor in environments with high numbers of user devices using various Wi-Fi standards. As new Wi-Fi systems are introduced to address the increased performance demands, coexistence and compatibility with legacy systems is necessary. With each new amendment to the Wi-Fi standard, additional signaling is required so the subsequent amended systems can identify each transmission and classify it as either one of the legacy systems transmissions or one from the newer amended standard. A design target for High Efficiency Wi-Fi (HEW) standard may be to adopt methods to improve the efficiency of Wi-Fi, and to distinguish between transmissions that are classified as coming from HEW computing devices or other devices.

DETAILED DESCRIPTION

Figure 1A:
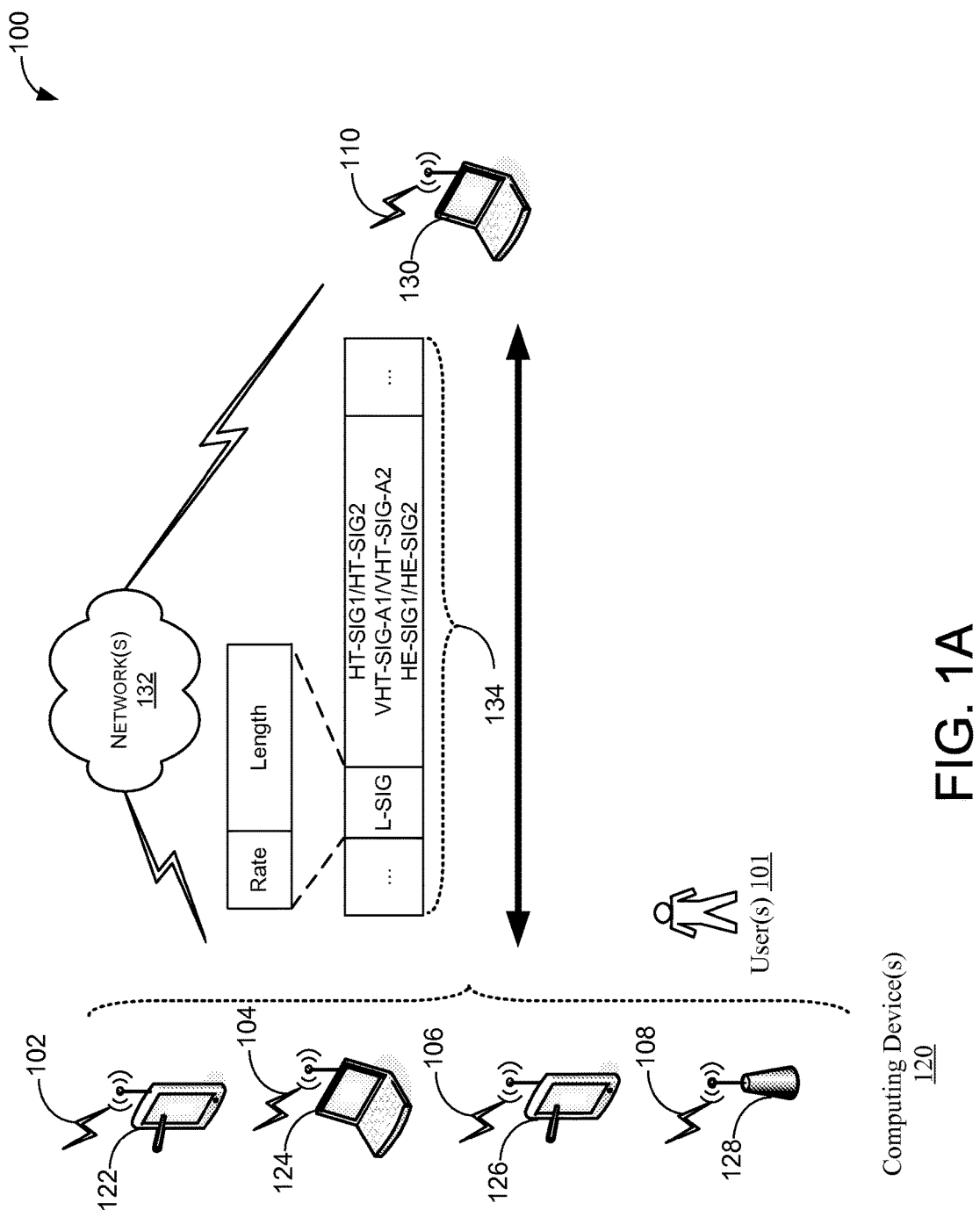
FIG. 1A depicts an illustrative schematic diagram between components of an illustrative signal classification system, according to one or more example embodiments of the present disclosure.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The word "exemplary" is used herein to mean "serving as an example, instance, or illustration." Any embodiment described herein as "exemplary" is not necessarily to be construed as preferred or advantageous over other embodiments. The terms "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, access terminal, or other personal communication system (PCS) device. The device may be either mobile or stationary.

One or more example embodiments discussed herein relate to systems, methods, and devices for signal classification using one or more characteristics of the various signal fields in a physical layer (PHY) preamble that may be transmitted between computing devices (e.g., an access point and/or a computing device). For example, a signal may be received by a device and based on the contents of various signal fields in the preamble it may be determined if the signal was transmitted using a compatible protocol. Although the present disclosure generally relates to Wi-Fi networks, including the family of IEEE 802.11 standards (e.g., IEEE 802.11 a/g, IEEE 802.11n, IEEE 802.11ac, IEEE 802.11ax, etc.), other wireless networks and protocols may be employ the techniques disclosed herein. It is understood that the release dates of the standards from earliest to latest is as follows: IEEE 802.11 a/g, IEEE 802.11n, IEEE 802.11ac, IEEE 802.11ax. It is also understood that the term "standard" may include amendments, revisions, and releases of the IEEE 802.11 standard. The terms "Wi-Fi" and "IEEE 802.11" may be interchangeably used throughout this disclosure.

During a wireless communication session, two or more computing devices may communicate with each other by sending and receiving data packets ("packets"), also referred to as data frames ("frames"). The packets may contain one or more preambles (e.g., PHY preamble, media access control (MAC) preamble, etc.). These preambles may be used, for example, to allow the computing devices to properly process an incoming packet that may be associated with a transmission signal sent from another computing device. A transmission signal ("signal") may be a signal containing packets that are intended for a receiving computing device. A preamble may be used in network communications to, at least in part, synchronize transmission timing between two or more devices. The length of the preamble may affect the time it takes to transmit packets, which in turn may increase the packet overhead.

Typically, a PHY preamble may include one or more signal fields that may be used by the computing devices to describe the payload of a data packet. For example, the PHY preamble may include a legacy signal field (L-SIG) to describe the data rate and length of the packet, such that a receiving computing device may calculate the time duration of the packet's transmission. Other signaling fields may also be included in the PHY preamble, based on the IEEE 802.11 standards used. For example, in the IEEE 802.11n standard, the PHY preamble may include an L-SIG field in addition to a high throughput signal (HT-SIG) field. In a subsequent IEEE 802.11ac standard, the PHY preamble may include an L-SIG field in addition to a very high throughput signal (VHT-SIG) field. The PHY preamble of the latest IEEE 802.11ax standard (also referred to as HEW standard) may include one or more of the signal fields of prior releases, such as, L-SIG, HT-SIG, and/or VHT-SIG fields in addition to a high efficiency signal (HE-SIG) field.

Backward compatibility may allow various IEEE 802.11 computing devices to communicate with each other even though they do not follow the same IEEE 802.11 standard. For example, a computing device following the IEEE 802.11a/g standard and a computing device following the IEEE 802.11n standard may communicate with each other even though they follow different standards. For example, in order for an IEEE 802.11n computing device to communicate with a high efficiency Wi-Fi ("HEW", also referred to as HE for High Efficiency) computing device, the HEW computing device may need to fallback to communicating using the IEEE 802.11n packet format. Although this affects the performance of the HEW computing device, this allows for backward compatibility with legacy computing devices. Since the IEEE 802.11n standard was introduced after the IEEE 802.11a/g standard, the IEEE 802.11n devices may support earlier IEEE 802.11a/g devices by utilizing a packet format consistent with the IEEE 80.11a/g standard. Further, the IEEE 802.11ac standard may support legacy systems such as IEEE 802.11a/g, and IEEE 802.11n. Similarly, HEW standard may support legacy standard, such as IEEE 802.11a/g, IEEE 802.11n, and IEEE 802.11ac.

As computing devices send and receive signals between them, another computing device may receive one or more signals even though the one or more signals were not intended for that computing device. This may occur when one or more computing devices are operating on overlapping channels. In some embodiments, coexistence of next generation Wi-Fi devices with legacy Wi-Fi devices may be provided such that computing devices operating within a short distance from each other and/or accessing an overlapping channel may be able to detect and defer signals that were not intended for those computing devices. A computing device may "defer" processing of received signals by staying off the channel for a time duration equal to the length value contained in the L-SIG of a PHY preamble associated with the signal. This mechanism may prevent the computing device from accessing the medium (e.g., a channel used for data transmission between two or more computing devices) when the data packet is not intended for that computing device.

Legacy Wi-Fi devices may also defer processing of additional signals when the legacy devices determine that the signals are coming from a later IEEE 802.11 standard.

Coexistence of the various Wi-Fi devices may be achieved by increasing the preamble portion of a packet and adding new fields with various modulation formats so that new releases could be identified. For example, adding a new field to the packet may indeed be easier to recognize since computing devices may be expecting this new field. On the other hand, devices following earlier IEEE 802.11 standards may not be expecting this new field, and therefore, may defer decoding the remainder of the packet. However, such increase in the preamble may increase the overhead needed to process the new fields.

Another approach may be to send an additional field that may be a repeat of one of the existing fields. This may still affect the preamble overhead but may not introduce additional operations to identify the repeated fields since such mechanisms may already be in place. For example, the L-SIG field may be repeated in new transmissions such that the receiving computing device using the HEW standard may expect to receive such field while devices following earlier IEEE 802.11 standards may not. Such approach may allow HEW computing devices to defer decoding transmissions that do not have the repeated L-SIG field if these transmissions were not intended for that HEW computing device. Similarly, devices following earlier IEEE 802.11 standards may not recognize the repeated L-SIG field and hence, would defer decoding those types of transmissions.

In one embodiment, next generation HEW computing devices may identify transmissions received by them as either a next-generation transmission or a legacy transmission. Legacy devices may be any device that follows previous Wi-Fi standards/amendments such as IEEE 802.11g/a, IEEE 802.11n or IEEE 802.11ac, etc. HEW computing devices may coexist with the legacy devices and may identify each transmission as either a HEW packet or a legacy packet. For example, if a HEW computing device receives a signal transmission from a device following the IEEE 802.11ac computing device, the HEW computing device may classify or determine the signal transmission as a HEW transmission or not.

In one embodiment, the HEW computing device may analyze the PHY preamble to determine the data rate, length field within one or more OFDM symbols, and the orientation of the one or more OFDM symbols. Various IEEE 802.11 standards may have specific requirements for data rate, length field, and/or orientation of one or more OFDM symbols. For example, an IEEE 802.11a/g packet may contain one L-SIG field in its PHY preamble, an IEEE 802.11n may have specific orientation of the L-SIG, HT-SIG fields, and an IEEE 802.11ac may have a requirement for the length field of the L-SIG field to be divisible by three. Therefore, HEW computing devices may distinguish received signals based, at least in part, on these various characteristics of the PHY preamble.

Symbols within a PHY preamble may be represented using a BPSK constellation map. Generally, data may be modulated using modulation techniques to be transmitted from one computing device to another. The modulated data for one or more IEEE 802.11 standards may include one or more OFDM symbols. These OFDM symbols may be mapped onto a "constellation map" to represent the symbols in by their phase separation on the constellation map. An example of a modulation scheme may be the binary phase-shift keying (BPSK). The BPSK modulation scheme maps data bits that are associated with the symbols to (I, Q) values that are represented on the constellation map. It should be noted that BPSK uses only one of the quadrature component but the constellation may be rotated to operate on the Q axis. A more detailed description of the BPSK is provided below. Using BPSK as an example, to assist a receiving computing device in recognizing that the PHY preamble belongs to IEEE 802.11ac packet, the two symbols included in the VHT-SIG-A (e.g., VHT-SIG-A1 and VHT-SIG-A2) may be represented in the BPSK constellation map as phase separated by 90 degrees. A phase rotation of 90 degrees may also be referred to as being orthogonal to each other. Orthogonality between symbols makes symbols easier to recognize and differentiate. Therefore, symbols may be compared between the various IEEE 802.11 standards by using the representations in one or more BPSK constellation map.

Data rate may be a characteristic that may be used to differentiate between the various IEEE 802.11 standards since each standard may operate at different rates. For example, in the IEEE 802.11n and IEEE 802.11ac systems, the rate field may be fixed to a known value and the length may be set to a length that would defer those devices from each other. For example, when a computing device receives a signal transmission that may not be intended for it, the computing device may determine, based on the data rate whether the transmission was intended for that computing device or was intended for computing devices following other IEEE 802.11 standards. However, there may situations where the data rate is not sufficiently deterministic of the standard used because rates between the various IEEE 802.11 may overlap. For example, the rate of IEEE 802.11ac packet may be similar to the rate of HEW packet.

Even though the rate field may be used to differentiate between various systems, it may be necessary to examine other characteristics, such as orientation of one or more signal fields. For example, the signal field, HT-SIG, of the IEEE 802.11n standard is composed of two OFDM symbols, HT-SIG1 and HT-SIG2. The signaling field of the IEEE 802.11ac is divided into two fields, VHT-SIG-A and VHT-SIG-B. The VHT-SIG-A field was introduced in the IEEE 802.11ac to replace the HT-SIG of the IEEE 802.11n. Using the orientation of these various signal symbols (e.g. HT-SIG1, HT-SIG2, VHT-SIG-A1 and VHT-SIG-A2), it may be possible to differentiate between computing devices, following the IEEE 802.11n and the IEEE 802.11ac. Similarly, the orientation of symbols following the HEW standard may be used to defer signals that may be received from computing devices following other IEEE 802.11 standards. For example, in an HEW system, the HE-SIG field may be composed of two OFDM symbols, HE-SIG1 and HE-SIG2. These two OFDM symbols may be rotated by 90 degrees between each other in the BPSK constellation. This orientation may assist an HEW computing device to defer signals coming from at least IEEE 802.11a/g and IEEE 802.11n, in case these signals were not intended for that HEW computing device.

In some embodiments, looking at the rate and the orientation of one or more OFDM symbols may not be sufficient to determine that the signal transmission is coming from an IEEE 802.11ac or from an HEW computing device. In addition to determining the rate and orientation of one or more OFDM symbols, in some embodiments, the HEW computing device may determine the value of the length field included in one of the one or more OFDM symbols (e.g., L-SIG) and determine whether the value of the length field is divisible by three. If the value of the length field is divisible by three, then the signal transmission may be determined to be coming from an IEEE 802.11ac device. Otherwise, if the value of the length field is not divisible by three, the signal transmission may be determined to be coming from an HEW computing device.

FIG. 1A depicts an illustrative schematic diagram between components of an illustrative signal classification system 100 in accordance with one or more embodiments of the disclosure. The illustrative signal classification system 100 may comprise computing device(s) 120 that may be communicating with one another through, at least in part, network(s) 132. For example, any of the computing devices 122, 124, 126, 128, and 130 may be configured to communicate with each other and any other component of the signal classification system 100 via, at least in part, the network(s) 132.

One or more illustrative computing device(s) 120 may be operable by one or more user(s) 101. The computing device(s) 120 (e.g., computing devices 122, 124, 126, 128 and 130) may include any suitable processor-driven computing device including, but not limited to, a desktop computing device, a laptop computing device, a server, a router, a switch, an access point, a smartphone, a tablet, wearable wireless device (e.g., bracelet, watch, glasses, ring, etc.) and so forth.

In the example embodiment of FIG. 1A, computing devices 122, 124, and 126 may include devices following IEEE 802.11a/g, 802.11n, and 802.11ac standards respectively. Computing devices 128 and 130 may be illustrated as HEW computing devices (e.g., following the 802.11ax standard). Although this example embodiment includes specific 802.11 standards and amendments, this is not intended to be a limitation, instead other IEEE 802.11 standards and amendments may be used.

During a wireless communication session between at least two computing devices 120, signals may be sent from a transmitting computing device to an intended receiving computing device. However, these signals may also be received by other computing devices 120 due, in part, to overlapping channels. Overlapping channels may occur in scenarios where one or more computing devices are operating with one access point. Overlapping channels may also occur between computing devices operating with multiple access point. The overlapping channels between two or more access points may be referred to as overlapping basic service set (BSS). A BSS may consist of a number of computing devices and an access point. In that scenario, computing devices following various IEEE 802.11 may determine whether to the received signals are intended for them or whether to defer decoding.

When a computing device receives signals not intended for it, the computing device may start processing the received signal in order to determine whether the signal was intended for it and whether the received signal follows the same IEEE 802.11 standard as the computing device. A packet associated with a signal may be preceded by, for example, a PHY preamble (e.g., 134). The PHY preamble 134 may be used in network communications to, at least in part, synchronize transmission timing between two or more devices. In an example, the HEW signal 110 transmitted from computing device 130 may be intended for computing device 128. The signal 110 may be received by any of the other computing devices 122, 124, and 126 that may be communicating or listening to an overlapping channel. For example, if the computing device 126 was within a reception range of the signal 110, then the computing device 126 may receive the signal 110, even though the computing device 126 was not the intended recipient of the signal 110. The reception range may be determined by a distance between computing devices, signal power, noise level, and the type of the computing device. It is understood that the above are only examples for determining a reception range and that other mechanisms may be employed to determine a reception range.

In some embodiments, each of the computing devices 120 (e.g., 122, 124, 126, 128 and 130) may determine whether any of the received signals are intended for these computing devices and whether to defer decoding the packets associated with the received signal. In order to do so, the computing devices 120 may differentiate between received packets by analyzing one or more fields in the PHY preamble.

Continuing with the above example, the computing device 126 may determine whether to decode or not decode the packet associated with the received signal 110. Similarly, other devices, such as 122, 124, 128, and 130 may need to determine whether to decode or defer decoding of packets associated with signals that may not be intended for those devices, but nonetheless were received by those devices. As another example, if the computing device 126, which is an IEEE 802.11ac device, receives the signal 102, the computing device 126 may determine that the signals 102 was not intended for it by analyzing the one or more signal fields (e.g., L-SIG) included in the PHY preamble. For example, if the computing device 126 receives the signal 102 coming from computing device 122, the PHY preamble associated with the signal 102 may be a preamble following the IEEE 802.11 a/g standard.

If the computing device 124 receives the signal 106, coming from computing device 126, the PHY preamble associated with the signal 106 may be a preamble following the IEEE 802.11ac standard. The computing devices 122, 124, 126, and 128 may utilize the characteristics of one or more signal fields in the PHY preamble to determine whether any of the received signals are intended for these computing devices and whether to decode the rest of the packets or defer decoding, as discussed below.

Figure 1B:
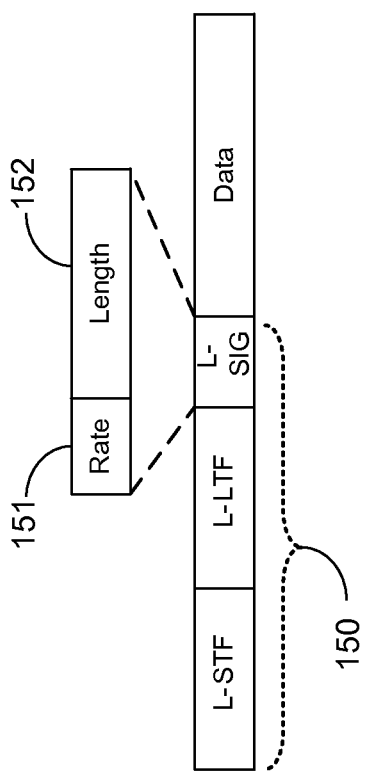
FIG. 1B depicts a packet format for a wireless communication network.
Figure 1C:
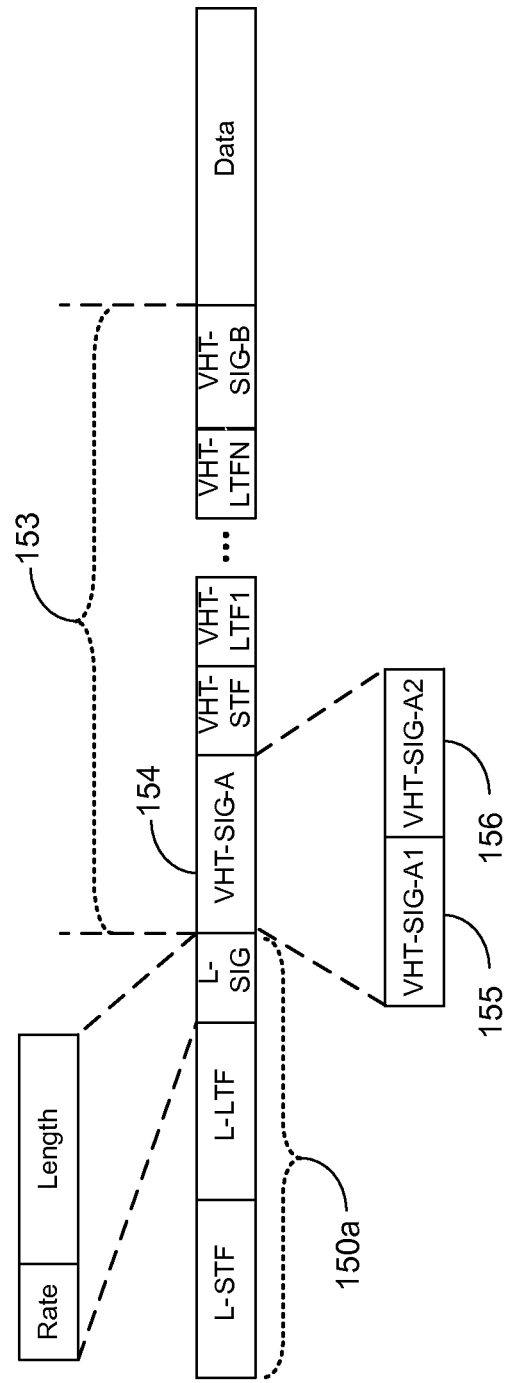
FIG. 1C depicts a packet format for a wireless communication network.
Figure 1D:
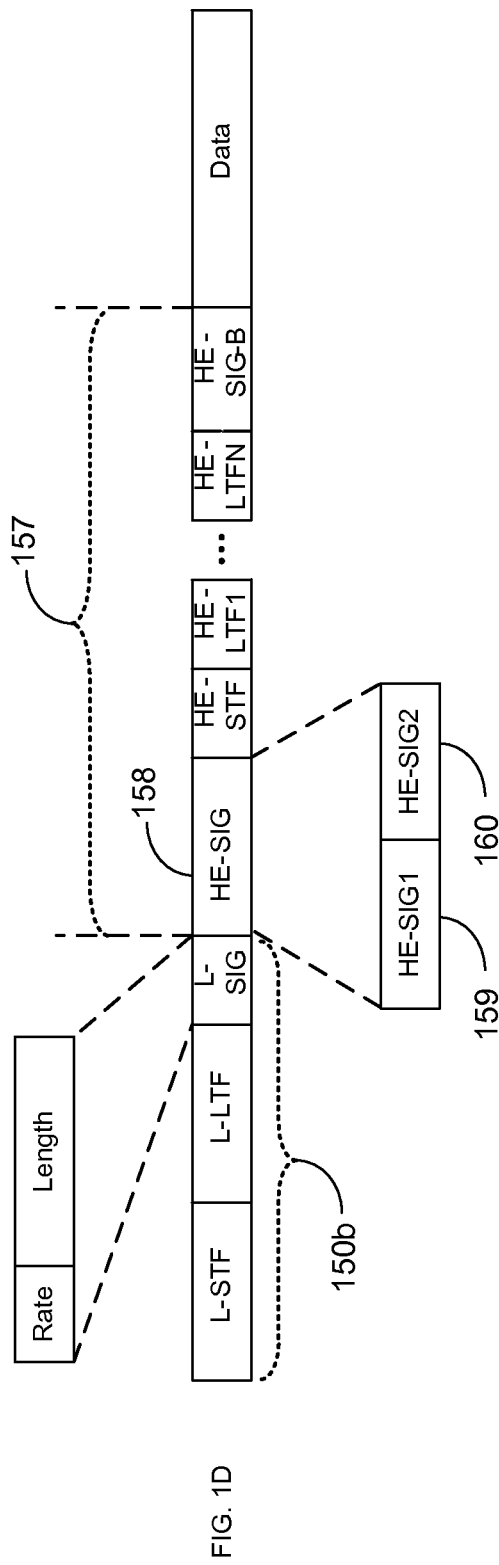
FIG. 1D depicts a packet format for a wireless communication network, according to one or more example embodiments of the present disclosure.

FIGS. 1B-1D depict various data packets having PHY preambles that are in accordance with various IEEE 802.11 standards. For example, FIG. 1B shows an IEEE 802.11a/g packet including a PHY preamble (e.g., 150). FIG. 1C shows an IEEE 802.11ac packet including a PHY preamble with two portions, 150*a* and 153. FIG. 1D shows an IEEE 802.11ax (or HEW) packet including an PHY preamble with two portions 150*b* and 157. The various fields included in these different preambles may be used to assist a computing device to determine the type of transmission being received. That is whether a transmission is an IEEE 802.11a/g, IEEE 802.11n, IEEE 802.11ac, or IEEE 802.11ax transmission.

FIG. 1B depicts an illustrative data packet format following one of the legacy IEEE standards (e.g., IEEE 802.11 a/g) that may define how legacy IEEE 802.11 devices operate in a legacy IEEE 802.11 system. For example, in the IEEE 802.11a/g standard, the packet structure may consist of a legacy preamble 150, which may contain a legacy short training field (L-STF), legacy long training field (L-LTF), and an L-SIG field, which may constitute the preamble of the data packet. The L-SIG field may provide information about the data field as far as coding and modulation (e.g., rate 151) and length 152 among other parameters. A data field (also referred to as payload) may be included in the preamble.

Although communication between legacy devices and later devices is possible for backward compatibility, IEEE 802.11a/g devices may defer signals that are not intended for those devices. The IEEE 802.11a/g devices may recognize the legacy portion of the packet, but may not recognize and hence may not be able to decode the rest of the packet correctly. In that case, IEEE 802.11a/g devices may defer from decoding the signal transmission for a time duration that may equal the length field contained in the L-SIG field.

FIG. 1C depicts an illustrative example of a packet format following the IEEE 802.11ac standard that may define how IEEE 802.11ac devices operate in an IEEE 802.11ac system. In an IEEE 802.11ac system, a packet may start with the legacy portion 150*a* of the preamble, which is meant to allow devices following earlier IEEE 802.11 standards to communicate with devices following the IEEE 802.11ac standard. Additionally, the packet may also contain a very high throughput (VHT) preamble 153 that may contain various fields that may follow the IEEE 802.11ac standard. The VHT preamble 153 may contain a VHT-SIG-A 154 field that may be comprised of two symbols, VHT-SIG-A1 155 and VHT-SIG-A2 156. The VHT preamble 153 may contain a number of VHT long training fields (VHT-LTF1 . . . VHT-LTFN), where N=1, 2, 8, that may be used for channel training having a duration of about 4 µs. The training fields may be followed by VHT-SIG-B field that may have a duration of 4 µs may follow the training fields. The VHT-SIG-B field may contain setting specific to each computing device. Subsequently, a data field may contain the data intended for a receiving computing device.

FIG. 1D depicts an illustrative example of a packet format following the IEEE 802.11ax or HEW standard that may define how HEW devices operate in an HEW system. In an HEW system, a packet may start with the legacy portion 150*b* of the preamble, which is meant to allow devices following earlier IEEE 802.11 standards to communicate with devices following the HEW standard. The 150*b* portion may be followed by a HE-SIG field 158. The legacy preamble portion 150*b* may be compatible with legacy standards such as IEEE 802.11a/g. Additionally, the packet may also contain a high efficiency (HE) preamble 157 containing various fields that may follow the IEEE 802.11 ax standard. The HE preamble 157 may contain a signal field HE-SIG 158, which may be comprised of two symbols, HE-SIG1 159 and HE-SIG 160. The HE preamble 157 may contain a number of HE long training fields (HE-LTF1 . . . HE-LTFN), where N=1, 2, 8, that may be used for channel training having a duration of about 4 µs. The training fields may be followed by a HE-SIG-B field that may have a duration of 4 µs may follow the training fields. The HE-SIG-B field may contain setting specific to each computing device. Subsequently, a data field may contain the data intended for a receiving computing device.

Another approach to differentiating between signals received from devices following earlier IEEE 802.11 standards (IEEE 802.11a/g, IEEE 802.11n, and/or IEEE 802.11ac) and newer IEEE 802.11 standards (e.g., HEW standard) may be to send an additional field in the newer standard, for example in an HEW packet, that may be a repeat of one of the existing fields. This may still affect the preamble overhead but may not introduce additional operations to identify the repeated fields since such mechanisms may already be in place. For example, the L-SIG field may be repeated in new transmissions such that the receiving computing device using the HEW standard may expect to receive such field while devices following earlier IEEE 802.11 standards may not. Such approach may allow HEW computing devices to defer decoding transmissions that do not have the repeated L-SIG field if these transmissions were not intended for that HEW computing device. Similarly, devices following earlier IEEE 802.11 standards may not recognize the repeated L-SIG field and hence, would defer decoding those types of transmissions.

Figure 1E:
FIG. 1E depicts a packet format for a wireless communication network, according to one or more example embodiments of the present disclosure.

FIG. 1E depicts an illustrative example of a packet format following the HEW standard using a repeated signal field. An additional L_SIG field (e.g., L-SIG repeated 162) that may be a repeat of the L-SIG field 161 may still affect the preamble overhead but may not introduce additional operations to identify the repeated fields since such mechanisms may already be in place. For example, the L-SIG field 161 may sent again as L-SIG repeated 162 in new HEW packets such that the receiving computing device using the HEW standard may expect to receive such field while devices following earlier IEEE 802.11 standards may not. With reference back to FIG. 1, in one example, if the computing device 122 receives a signal not intended for it, such as signal 104, the computing device 122 may determine that the received signal transmission was not intended for it based, at least in part, on characteristics of the one or more signaling fields included in the PHY preamble. The computing device 122 may recognize the legacy portion of the preamble, but not the portion following the legacy portion because the PHY preamble of computing devices following the IEEE 802.11n may contain additional fields compared computing devices following the IEEE 802.11a/g. Accordingly, the computing device 122 may defer decoding the received signal by staying off the channel for a time duration that may be equal to the value of the length field contained in the L-SIG field of the PHY preamble.

In another example, an IEEE 802.11ac device (e.g., computing device 126) may distinguish IEEE 802.11ac packets from IEEE 802.11a/g and IEEE 802.11n packets based at least in part on the orientation of the BPSK representation of one or more signal fields, such as the HT-SIG1, HT-SIG2, VHT-SIG-A1 and/or VHT-SIG-A2 to distinguish between signal transmissions. For example, if computing device 126 receives the signals 102 and/or 104, the computing device 126 may determine the orientation of the one or more signal symbols included in the received PHY preamble of the signals 102 and/or 104. The computing device 126 may determine whether it was the intended recipient based on the fact that the IEEE 802.11a/g packets do not have additional signal fields and the fact that HT-SIG1 in signal 104 is orthogonal to the corresponding IEEE 802.11ac VHT-SIG-A1 symbol. If the signal was not intended for the computing device 126, the computing device 126 may defer decoding the received signal by staying off the channel for a time duration that may be equal to the value of the length field contained in the L-SIG field of the PHY preamble In another embodiment, the HEW computing devices 128 and 130 may distinguish HEW packets from legacy IEEE 802.11a/g, IEEE 802.11n, and IEEE 802.11ac packets. For example, the HEW computing device 130 may decode/analyze the PHY preamble of a received signal (e.g., 102, 104 and/or 106) to determine the data rate, the orientation of one or more OFDM symbols, and/or the length of one or more OFDM symbols in order to distinguish HEW packets from other IEEE 802.11 packets.

A BPSK modulation scheme maps data bits that are associated with the symbols to (I, Q) values that are represented on a constellation map. The symbols are represented using "in-phase (I) and "quadrature" (Q) as axes on the constellation map. To represent the symbols, BPSK uses binary "0" and binary "1" that symbolizes two phases, which are separated by 180 degrees. For example, if binary "0" is on the I axis, binary "1," which is separated by 180 degrees from the binary "0," will be on the I axis. For example, an IEEE 802.11a/g PHY preamble may contain an L-SIG field, which is represented as L-SIG symbol 302 that may be represented in the BPSK constellation map 340 as having its binary constituent (0,1) on the I axis.

For example, in the case computing device 130 receives the signal 102, which is an IEEE 802.11a/g transmission, the computing device 130 may determine that the signal is not a HEW transmission based mainly on the L-SIG field contained in the packets associated with signal 102. For instance, based on the data rate and the fact that 802.11a/g packets do not include additional signal fields, the computing device 130 may determine that the signal is coming from a legacy device. If the computing device 130 was not the intended recipient of the signal 102, the computing device 130 may defer decoding the rest of the packet.

In the case computing device 130 receives the signal 104 from computing device 124, determining the data rate included in the L-SIG portion of the PHY preamble may not be sufficient to determine whether the signal is a HEW transmission or another type of transmission. The computing device 130 may utilize the orientation of the modulated HT-SIG1, and the HE-SIG1 to differentiate IEEE 802.11n packets because the HE-SIG1 symbol in an HEW packet may be orthogonal (e.g., rotated by 90 degrees in the BPSK constellation map) to the HT-SIG1 symbol of the IEEE 802.11n packets in the BPSK constellation map. Therefore, the computing device 130 may determine the orientation of the signal fields symbols and may determine whether the packet is an IEEE 802.11n transmission or an HEW transmission.

In the case computing device 130 receives signal 106, which is an IEEE 802.11ac transmission, the computing device 130 may determine, in addition to determining the rate and the symbol orientation, the length field contained in the L-SIG field. In one embodiment, HEW packets and IEEE 802.11ac may have similar orientation of their respective signal symbols. For example, an HEW signal orientation for L-SIG, HE-SIG1, and HE-SIG2, may have the same orientation of an IEEE 802.11ac signal for L-SIG, VHT-SIG-A1, and VHT-SIG-A2, respectively. Accordingly, another mechanism may be used to differentiate between HEW packets and IEEE 802.11ac packets.

The feature of the IEEE 802.11ac that may require that the length in the L-SIG may be divisible by three may be used to differentiate between the IEEE 802.11ac systems and the HEW systems. For example, if an HEW computing device determines that the length field in the L-SIG is not divisible by three, the computing device may determine that the signal is an HEW transmission. Therefore, the computing device may continue decoding the data packets associated with the transmission signal.

In one embodiment, HEW computing devices may distinguish HEW packets from IEEE 802.11ac packets by determining the length of the L-SIG field in the received packet is not divisible by three. For example, HEW packets may contain a length field of the L-SIG that may be set to a value that is not divisible by 3. Doing so may allow the differentiation between HEW and IEEE 802.11ac packets. Accordingly, the length field of the L-SIG field included in the data packets may evaluate to determine whether the length field may be divisible by 3 or not.

Any of the communications networks may include, but not limited to, any one or a combination of different types of suitable communications networks such as, for example, broadcasting networks, cable networks, public networks (e.g., the Internet), private networks, wireless networks, cellular networks, or any other suitable private and/or public networks. Further, any of the communications networks (e.g., network(s) 132) may have any suitable communication range associated therewith and may include, for example, global networks (e.g., the Internet), metropolitan area networks (MANs), wide area networks (WANs), local area networks (LANs), or personal area networks (PANs). In addition, any of the communications networks (e.g., network(s) 132) may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

The computing device(s) 120 may communicate with one or more access points 140. The access point(s) 140 may be configured to provide access to one or more wireless networks. The access point(s) 140 may provide wireless signal coverage for a predefined area. The computing device 120 may communicate with the access point(s) 140 wirelessly or through one or more network(s) 132. The access point(s) 140 may be a wireless access point, a router, a server, another mobile device, or any device that may wirelessly communicate with the computing device 120 to provide the computing device 120 access to a network, such as the Internet.

Any of computing device(s) 120 and access point(s) 140 may include one or more communications antennae. Communications antenna may be any suitable type of antenna corresponding to the communications protocols used by the computing device(s) 120 and access point(s) 140. Some non-limiting examples of suitable communications antennas include Wi-Fi antennas, IEEE 802.11 family of standards compatible antennas, directional antennas, non-directional antennas, dipole antennas, folded dipole antennas, patch antennas, MIMO antennas, or the like. The communications antenna may be communicatively coupled to a radio component to transmit and/or receive signals, such as communications signals to and/or from the computing devices(s) 120. Any of the computing device(s) (e.g., computing device(s) 120 and 150) and access point(s) 140, may include any suitable radio and/or transceiver for transmitting and/or receiving radio frequency (RF) signals in the bandwidth and/or channels corresponding to the communications protocols utilized by any of the computing device(s) 120 and access point(s) 140 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the IEEE 802.11 standards. In certain example embodiments, the radio component, in cooperation with the communications antennas, may be configured to communicate via 2.4 GHz channels (e.g. 802.11b, 802.11g, 802.11n, and 802.11ax), 5 GHz channels (e.g. 802.11n, 802.11ac, and 802.11ax), or 60 GHZ channels (e.g. 802.11ad) or any other 802.11 type channels (e.g., 802.11ax). In some embodiments, non-Wi-Fi protocols may be used for communications between devices, such as Bluetooth, dedicated short-range communication (DSRC), Ultra-High Frequency (UHF), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Figure 2:
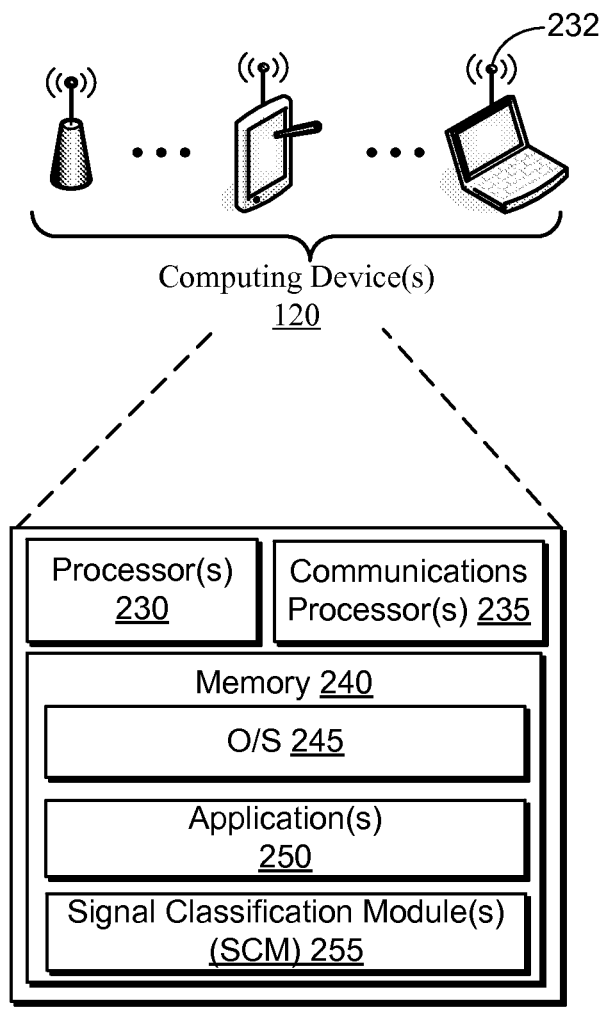
FIG. 2 depicts a schematic block diagram illustrating an example architecture of a computing device configured for signal classification, according to one or more example embodiments of the present disclosure.

FIG. 2 depicts a simplified block diagram illustrating an example architecture of computing device(s) 120 configured for signal classification, in accordance with example embodiments of the disclosure.

The computing device(s) 120 may include any suitable processor-driven computing device including, but not limited to, a desktop computing device, a laptop computing device, a server, a router, a switch, an access point, a smartphone, a tablet, wearable wireless device (e.g., bracelet, watch, glasses, ring, etc.) and so forth. For ease of explanation, the computing devices 120 may be described herein in the singular (e.g., computing device 120a); however, it should be appreciated that multiple computing devices 120 may be provided.

One or more of the computing device(s) 120 may include one or more processors 230, one or more communications processors 235, one or more antennas 232, and/or one or more memories 240. The computing device(s) 120 may include one or more modules that may process signal transmission packets to decode and analyze one or more fields included in the signal transmission packets.

As depicted herein, the processors 230 may be configured to operate instructions, applications, and/or software associated with services provided by the computing device(s) 120. These instructions, applications, and/or software may be stored on the memory 240, depicted as one or more operating systems (O/S) 245 and/or one or more applications 250, and may be retrievable and executable by the processors 230. Alternatively, the instructions, applications, and/or software executed by the processors 230 may be stored in any suitable location, such as the cloud or other remote locations. The instructions, applications, and/or software modules, such as O/S 245 and/or application 250 may or may not correspond to physical locations and/or addresses in the memory 240. In other words, the contents of each of the modules may not be segregated from each other and may be in fact stored in at least partially interleaved positions on the memory 240.

The processor(s) 230 may include, without limitation, a central processing unit (CPU), a digital signal processor (DSP), a reduced instruction set computer (RISC), a complex instruction set computer (CISC), or any combination thereof. The computing device(s) 120 may also include a chipset (not shown) for controlling communications between the processor(s) 230 and one or more of the other components of the computing device(s) 120. In one embodiment, the computing device(s) 120 may be based on an Intel® Architecture system, and the processor(s) 230 and the chipset may be from a family of Intel® processors and chipsets, such as the Intel® Atom® processor family. The processor(s) 230 may also include one or more processors as part of one or more application-specific integrated circuits (ASICs) or application-specific standard products (ASSPs) for handling specific data processing functions or tasks.

The one or more antennas 232 may be any suitable antenna for wireless communications. In some cases, the one or more antennas 232 may be integrated with one of the communications processors 235, the processors 230, or any other elements of the computing device(s) 120. The one or more antennas 232 may be any suitable type of antenna corresponding to the communications protocols used by the computing device(s) 120. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the computing device(s) 120.

The communications processor(s) 235 may be configured to communicate with the processors 230 or other elements of the computing device(s) 120 to transmit and/or receive communications signals via any suitable communications mechanism, link, channel, or standard. The communications processor 235 may be configured to receive a communications signal and appropriately modulate, or otherwise transform the signal and provide the signal to the antenna 232 for transmission via wireless channels, such as Wi-Fi. The communications processors 235 may further be configured to receive communications signals from the antenna 232 and demodulate, or otherwise transform, the received signals, and provide the transformed signals to the processors 230 for further processing and/or storage. In certain aspects, the communications processors 235 may enable communications using a variety of modulation schemes, standards, and channels. In some cases, the communications processors 235 may be a separate element from the processors 230 and, in other cases, the communications processors 235 may be integrated with the processors 230.

The memory 240 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The O/S 245 may be configured to enable the operation of the one or more applications 250 on the processors 230. In one aspect, the O/S 245 may provide a common interface for the application 250 to interface with, utilize, and/or control the various hardware elements of a computing device(s) 120. The details of operating systems are well known and will not be discussed in significant detail herein. Example operating systems may include, but are not limited to, Google® Android®, Apple® iOS®, Microsoft® Windows Mobile®, Microsoft® Windows 7®, or the like.

The O/S 245 may be configured to enable the operation of the one or more signal classification module(s) ("SCM") 255 on the processors 230 and/or communications processors 235 of the computing device(s) 120.

The SCM 255 may analyze the signal fields received included in the PHY preamble of a received signal. For example, the HEW computing device 130 may decode portions of the PHY preamble of a received signal to determine the data rate, the orientation of one or more OFDM symbols, and/or the length of one or more OFDM symbols in order to distinguish HEW packets from other IEEE 802.11 packets.

The SCM 255 may defer legacy devices in case a received signal was determined to not be intended for a HEW computing device while. A computing device may defer processing of received signals by staying off the channel for a time duration equal to the value of the length field of the L-SIG field in the PHY preamble if the received signal was not intended for that computing device. In one example, if the computing device 130 receives a signal that was not intended for it from a computing device following the IEEE 802.11ac standard, e.g., computing device 126, the computing device 130 may defer decoding of the packets associated with that signal.

The SCM 255 may introduce minimal to no additional overhead to the one or more transmissions by setting the value of the length field of the L-SIG field to be not divisible by three. The length of a preamble may affect the time it takes to transmit packets, which in turn may increase the packet overhead. Although it may be possible to achieve coexistence of the various Wi-Fi devices by increasing the preamble portion of a packet and adding new fields with various modulation formats so that new releases could be identified, such increase may increase the overhead. For example, adding one or more symbols to the PHY preamble may increase the time it takes to transmit the PHY preamble such that the overhead needed for identification of signals received at a computing device may be increased. In another embodiment, the SCM 255 may send an additional field that may be a repeat of one of the existing fields, e.g., L-SIG. Such approach may allow HEW computing devices to defer decoding transmissions that do not have the repeated L-SIG field. Similarly, devices following earlier IEEE 802.11 standards may not recognize the repeated L-SIG field and hence, would defer decoding those types of transmissions. This approach may still affect the preamble overhead duration but may not introduce additional operations to identify the repeated fields since such mechanisms may already be in place. Therefore, by setting the value of an existing length field following a criteria, the SCM 255 may introduce minimal to no additional overhead to the one or more transmissions in order to defer between IEEE 802.11 device packet transmissions.

In some embodiments, the SCM 255 may use the rate field of the L-SIG to defer legacy systems (e.g., IEEE 802.11 a/g). For example, if the computing device 130 receives a signal from an IEEE 802.11 a/g computing device 122, the rate field may be sufficient to distinguish HEW transmissions from legacy transmissions. However, if the HEW computing device 128 could not properly determine the rate field and since the signal is a legacy transmission, the PHY preamble may lack additional signaling fields (e.g., HE-SIG) that may be expected by the HEW computing device. Therefore, the SCM 255 may still defer decoding of the received signal 102.

In some embodiments, the SCM 255 may use the length field of the L-SIG to defer packets coming from IEEE 802.11ac computing devices, such as 126, if the received signal 106 was not intended for the computing device executing the SCM 255. For example, if the length field in the L-SIG field of the PHY preamble of the received signal 106 is divisible by three, then SCM 255 may determine that the received signal 106 is not associated with an HEW packet and therefore may defer decoding for the rest of the packet.

The SCM 255 may modify a length field in the legacy L-SIG to defer transmission from other systems. The SCM 255 may modify the length for HEW signals by setting the length field in the L-SIG field to be slightly longer that what the length was set in the IEEE 802.11ac. For example, in IEEE 802.11ac, the length field of the L-SIG was set to a value that may cover the total length of an IEEE 802.11ac packet such that the total length is divisible by three. Therefore, the SCM 255 may set the length for the HEW standard to be longer than the one in the IEEE 802.11ac such that the length is not divisible by three. In doing so, HEW computing devices may determine whether a packet is an HEW packet or not based on the determination of the length field included in the received signal.

The SCM 255 may modulate an HE-SIG field with BPSK and may modulate another HE-SIG field with a rotated BPSK in order to defer packet transmission from legacy devices such as, IEEE 802.11a/g and IEEE 802.11n devices. For example, in a HEW system, the HE-SIG field of the PHY preamble may be composed of two OFDM symbols, HE-SIG1 and HE-SIG2. These two OFDM symbols may be rotated by 90 degrees between each other in the BPSK constellation. Compared to the IEEE 802.11a/g signal field, which is represented by one symbol, L-SIG, HEW computing devices may be able to distinguish between IEEE 802.11a/g and HEW transmissions. In IEEE 802.11n, the two symbols, HT-SIG1 and HT-SIG2, of the HT-SIG field have the same rotations as each other in the BPSK constellation map. Therefore, an HEW computing device may be able to distinguish between IEEE 802.11n and HEW transmissions based on the difference in orientation.

Figure 3:
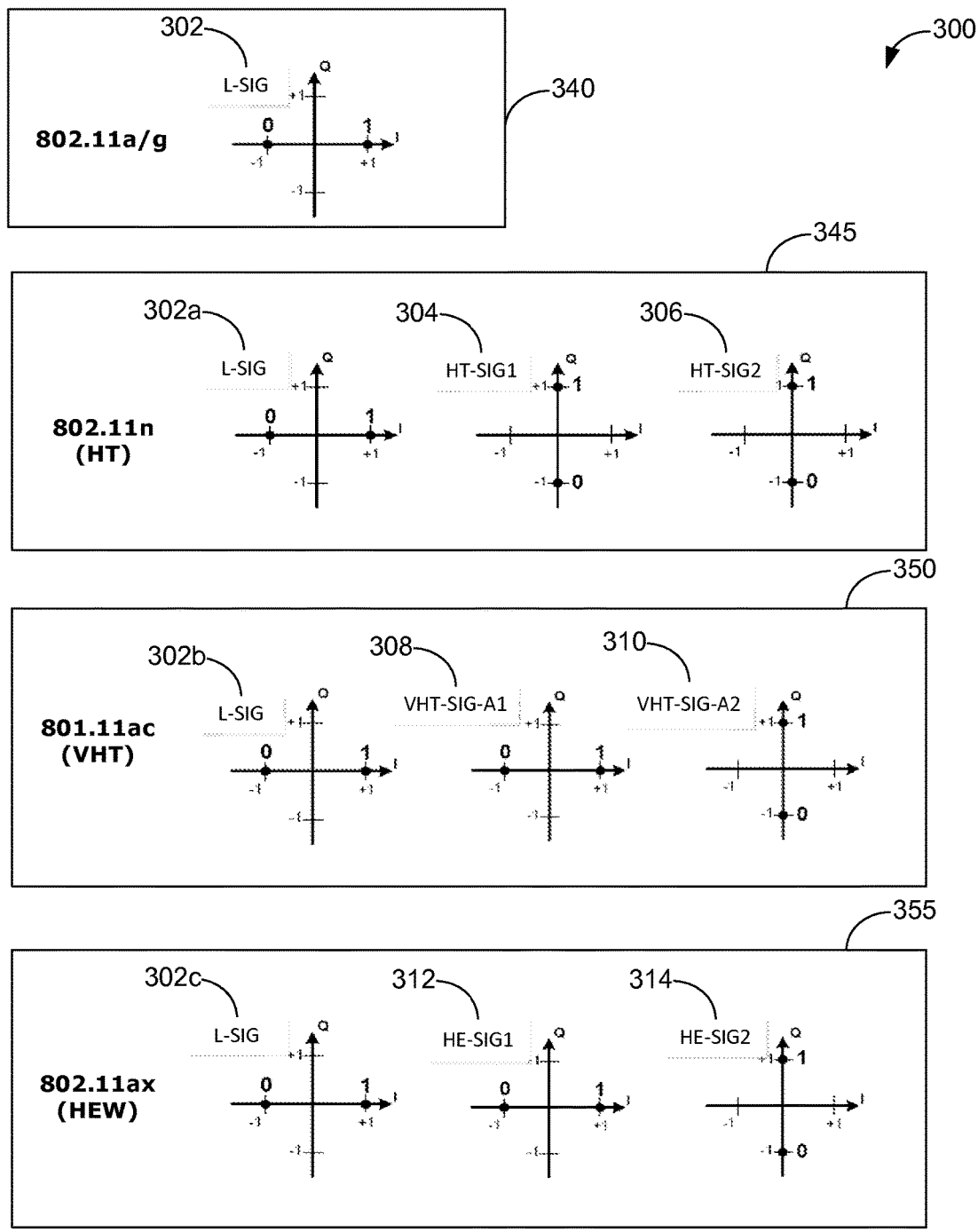
FIG. 3 depicts an illustrative signal classification system, according to one or more example embodiments of the present disclosure.

FIG. 3 depicts an illustrative signal classification system showing a set of BPSK constellation maps 300 for various IEEE 802.11 standards in accordance with one or more embodiments of the disclosure.

FIG. 3 shows the BPSK representation of the signal fields associated with various IEEE 802.11 standards, such as a BPSK constellation map 340 for IEEE 802.11 a/g, a BPSK constellation map 345 for IEEE 802.11n, a BPSK constellation map 350 for IEEE 802.11ac, and a BPSK constellation map 355 for IEEE 802.11ax (e.g., HEW) standards.

In one embodiment, the orientation of one or more symbols representing signal fields in the PHY preamble such as L-SIG, HT-SIG, VHT-SIG, and HE-SIG, may distinguish between the various IEEE 802.11 standards. The symbols may be represented in the set of BPSK constellation maps 300.

The IEEE 802.11n may have three symbols, L-SIG 302a, HT-SIG1 304, HT-SIG2 306 represented in the BPSK constellation map 345. For example, the L-SIG 302a may be represented on the I axis, the HT-SIG1 304 on the Q axis, and the HT-SIG2 306 on the Q axis.

The IEEE 802.11ac may have three symbols, L-SIG 302b, VHT-SIG-A1 308, VHT-SIG-A2 310 represented in the BPSK constellation map 350. For example, the L-SIG 302b may be represented on the I axis, the VHT-SIG-A1 308 on the I axis, and the VHT-SIG-A2 310 on the Q axis. Symbols represented on opposite axis may be referred to as orthogonal to each other. In the case of IEEE 802.11ac, the VHT-SIG-A1 308 and the VHT-SIG-A2 310 are orthogonal to each other.

In one embodiment, HEW computing devices may distinguish HEW transmissions based, at least in part, on the orientation of one or more symbols in the signal field of the PHY preamble. For example, HEW may have three symbols, L-SIG 302c, HE-SIG1 312, and HE-SIG2 314 represented in the BPSK constellation map 355. For example, the L-SIG 302c may be represented on the I axis, the HE-SIG1 312 on the I axis, and the HE-SIG2 314 on the Q axis. Therefore, the HE-SIG1 and HE-SIG2 are orthogonal to each other and more importantly, their orientation is similar to the IEEE 802.11ac symbols. However, this may make the representation of the HE-SIG symbols similar to the representation of the VHT-SIG and hence HEW transmissions may not be easily distinguished using the orientation of the symbols. For example, if an IEEE 802.11ac transmission (e.g., signal 106 of FIG. 1A) not intended for an HEW computing device 130 may not be able to distinguish whether the signal 106 was an HEW transmission or an IEEE 802.11ac transmission because the orientation of the signal field symbols are the same.

On the other hand, having the same representation as the VHT-SIG rotation may afford the ability for an HEW computing device, e.g., computing device 128 to defer legacy IEEE 802.11a/g, and IEEE 802.11n transmission or any other legacy transmissions (e.g., signals 102 and 104) based on the orientation of the symbols.

In one embodiment, the length field included in the L-SIG field of an HEW transmission may be used to differentiate between HEW computing devices and IEEE 802.11ac devices. For example, the IEEE 802.11ac includes strict rules with regard to the length field of its L-SIG field. The length in the L-SIG was set to be divisible by three in IEEE 802.11ac. For example, when a transmission is received by an IEEE 802.11ac computing device, the IEEE 802.11ac computing device may determine whether the length field of the L-SIG field is or is not divisible by three. If the length was not divisible by three, the IEEE 802.11ac computing device must defer by staying off the air for a period corresponding to the length of the rest of the packet. On the other hand, in case the length value was divisible by three, the IEEE 802.11ac computing device may continue to decode the packet.

In one embodiment, the L-SIG field of an HEW packet may contain a length field that may be modified to follow a criteria that may be different that the other IEEE 802.11 standards. The criteria may be increasing the length with minimal impact on the overhead of the PHY preamble. For example, to identify HEW packets, the approach may be to set the length value in the L-SIG of an HEW packet to not be divisible by three. This may allow an IEEE 802.11ac computing device to be properly deferred since it may fail this test.

Additionally, a repetition of the L-SIG may be used to improve performance in large delay spread channels. In one embodiment, this may be applicable in HEW with outdoor use cases. The repeated L-SIG may be only populated with even tones of the L-SIG, and the two SIG fields may be coherently combined to provide an enhanced (better performance in all channels), detection of the Legacy Length field. This may further enhance the performance of the approach since the detection of the Length field may be more robust. Thus, adding an additional L-SIG, while optional, may improve performance.

Figure 4:
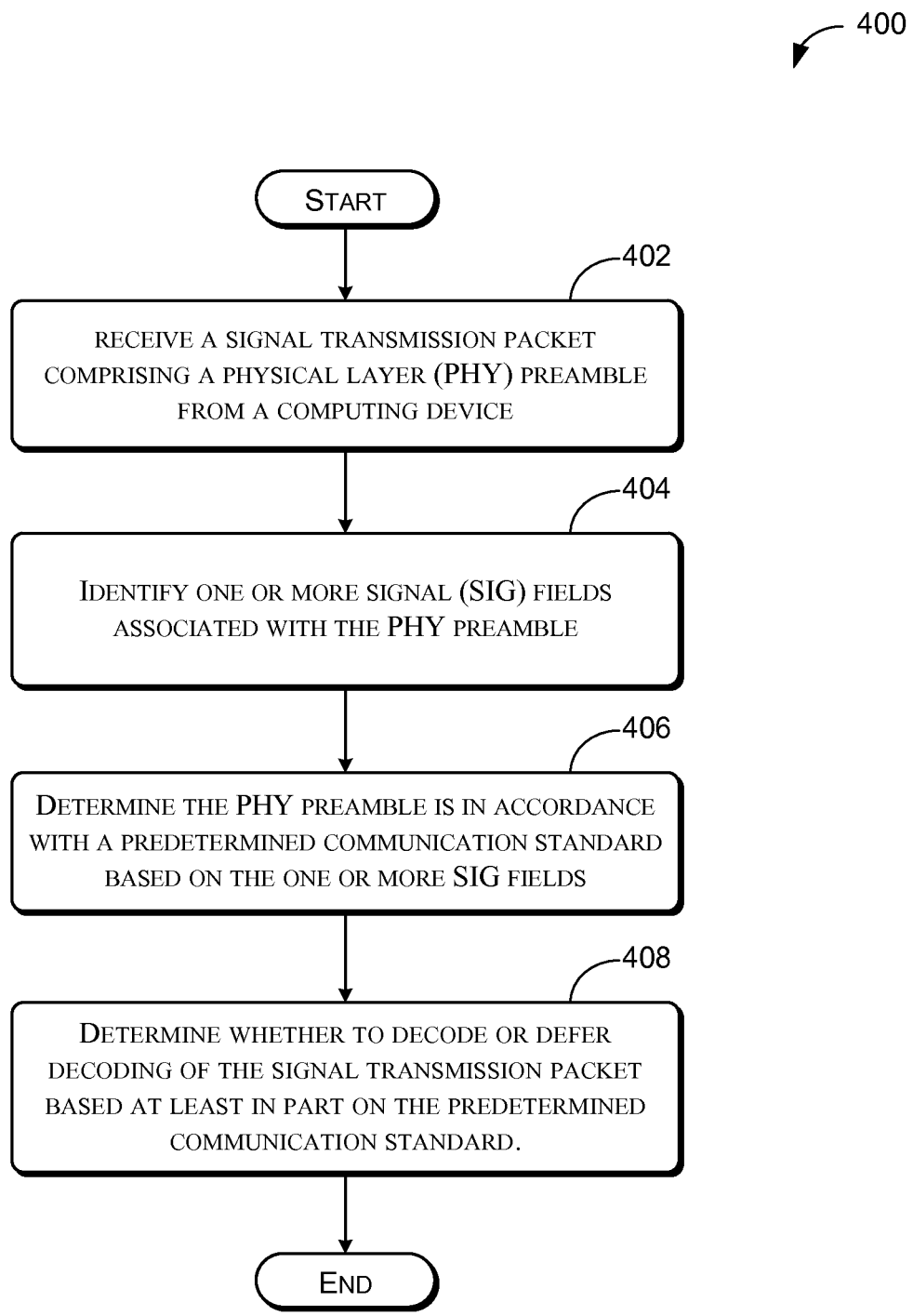
FIG. 4 depicts a flow diagram of an illustrative process for a signal classification system, according to one or more example embodiments of the present disclosure.

FIG. 4 illustrates a flow diagram of illustrative process 400 for a signal classification system in accordance with one or more embodiments of the disclosure. The process 400 may generally include receiving a signal transmission packet comprising a physical layer (PHY) preamble from a computing device (block 402). The process 400 may include identifying one or more signal (SIG) fields associated with the PHY preamble (block 404). For example, the PHY preamble may include an L-SIG field that may have a rate field and/or a length field. The rate field is deterministic of the transmission rate of the signal transmission packet, while the length field is indicative of the length of the received signal transmission packet. The process 400 may include determining whether the PHY preamble is in accordance with a predetermined communication standard based at least in part on the one or more SIG fields (block 406). For example, an HEW device may determine whether the PHY preamble is in accordance with the HEW standard. That is the PHY preamble may include one or more HE SIG fields (e.g., HE-SIG, HE-SIGB, etc.). The process 400 may determine whether to decode or defer decoding of the signal transmission packet based at least in part on the predetermined communication standard (block 408).

Figure 5:
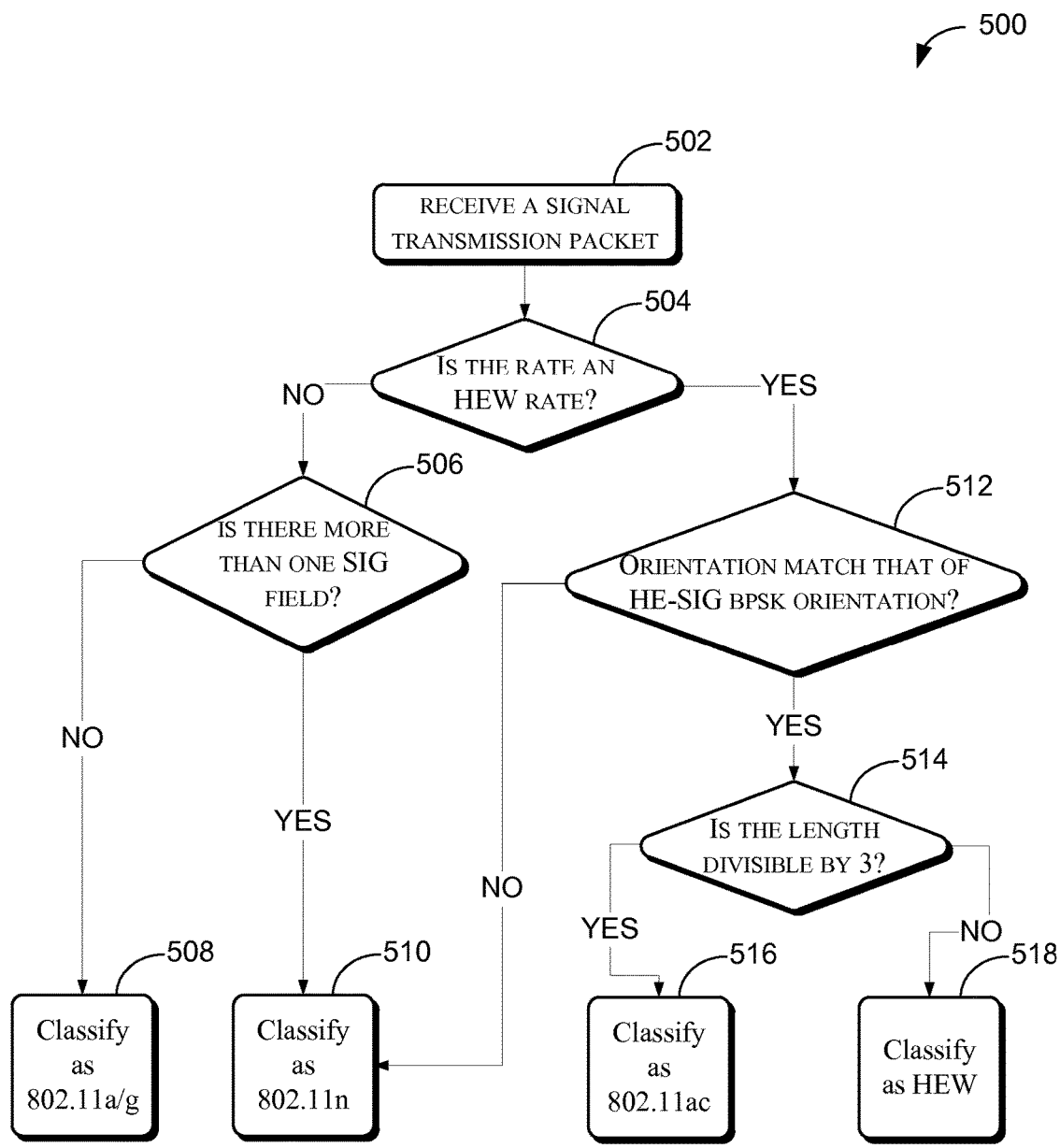
FIG. 5 depicts a flow diagram of an illustrative process for a signal classification system, according to one or more example embodiments of the present disclosure.

FIG. 5 illustrates a flow diagram of illustrative process 500 for a signal classification system in accordance with one or more embodiments of the disclosure. The process 500 may generally include receiving a signal transmission packet comprising a physical layer (PHY) preamble from a computing device (block 502), where the PHY preamble may include an L-SIG field. The process 500 may determine whether the rate field in the L-SIG is a rate associated with HEW transmissions (block 504), if the rate is not an HEW rate, then the process 500 may determine whether there are any additional SIG fields included in the received signal transmission packet (block 506). The process 500 may classify the signal transmission packet as an IEEE 802.11a/g transmission if there were no more SIG field in the PHY preamble (block 508). The process 500 may classify the signal transmission packet as an IEEE 802.11 n transmission if there were additional SIG fields included in the PHY preamble. If the process 500 determines that the rate field is one that is associated with an HEW rate, then the process 500 may proceed to determining the orientation of the SIG fields included in the PHY preamble (block 512). If the orientation of the SIG fields do not match the HE-SIG BPSK orientation, the process 500 may classify the received signal transmission packet as an IEEE 802.11n transmission (block 510), even though the rate was determined to be an HEW rate because of possible error in the received rate. If the process 500 determines that the orientation of the SIG fields included in the PHY preamble of the received signal transmission packet do match those of an HE-SIG BPSK orientation, the process 500 proceed to determining whether the length field in the L-SIG field of the PHY preamble is divisible or not divisible by three (block 514). If the process 500 determines that the length is divisible by three, the process 500 may classify the received signal transmission packet as an IEEE 802.11ac transmission (block 516). However, if the process 500 determines that the length is not divisible by three, the process 500 may classify the signal transmission packet as an HEW packet (block 518).

At block 502, the SCM 255 may receive a packet comprising a legacy portion and a non-legacy portion, following a communication standard, from a second computing device. During a communication session between computing devices, packets may be sent and received. The packets may include one or more preambles such as a PHY preamble. The packets may be sent in the air in the form of signals from one computing device to another. The PHY preamble may consist of at least a legacy portion and a non-legacy portion. There may be one or more characteristics associated with the one or more fields included in the PHY preamble. The characteristics of one or more signal fields included within one or more data packets may be utilized to differentiate, and hence defer decoding data packets that were not intended for a computing device following the one or more IEEE 802.11 standards. Examples of characteristics within the one or more signaling fields may include a length field characteristic, a rate field characteristic, and an orientation characteristic of one or more signaling fields, or any combination thereof. These characteristics may be specific to the standards followed by the computing devices involved in the communication. For example, the rate, length, and orientation of symbols may be different from one standard to another, and therefore may be utilized as a means to differentiate between the standards. For example, the legacy portion may contain an L-SIG field that includes a rate field and a length field. The rate field and the length field may be utilized by the receiving computing device to calculate the time duration of the packet.

At block 504, the SCM 255 may determine whether the rate field included in the L-SIG field is associated with an HEW rate or not. The SCM 255 may evaluate one or more fields associated with the legacy portion of the packet. For example, when a computing device receives the PHY preamble, the computing device may be uncertain that the received signal was intended for it and whether the signal follows the computing device's IEEE 802.11 standard. In order to determine that a transmission follows the same IEEE 802.11 standard as the computing device, the computing device may evaluate, for example, the characteristics of the L-SIG fields that may be contained in the PHY preamble of the received signal. If SCM 255 determines that the rate included in the L-SIG field of the received signal transmission packet is not an HEW rate in accordance with the IEEE 802.11ax standard, the SCM 255 may determine that the signal transmission packet is either an IEEE 802.11a/g or an IEEE 802.11n packet because these two standards (e.g., IEEE 802.11 a/g or an IEEE 802.11 n) may have a different rate than the HEW rate included in the received signal transmission packet.

At block 506, the SCM 255 may determine whether there are more SIG fields included in the received signal transmission packet. If there were no more SIG fields included in the PHY preamble, then the SCM 255 may classify that the received signal transmission packet is in accordance with an IEEE 802.11a/g (block 508) because IEEE 802.11a/g transmissions typically include a legacy PHY, which includes an L-SIG field (as shown in FIG. 1B). However, if the SCM 255 determines that there are more SIG fields included in the received PHY preamble, the SCM 255 may classify the received signal transmission packet as an IEEE 802.11n transmission (block 510).

If the SCM 255 determines at block 504 that the rate is an HEW rate in accordance with the IEEE 801.11ax standard, then the received packet may be an HEW packet or an IEEE 802.11ac packet because the HEW rate in the L-SIG field may be the same as that of the IEEE 802.11ac rate in the L-SIG field.

At block 512, the SCM 255 may determine the orientation of one or more SIG fields that may be included in the received signal transmission packet. For example, when a computing device receives a signal transmission that may not be intended for it, the SCM 255 may determine whether the orientation of one or more SIG symbols included in the PHY preamble match those of an HEW transmission in accordance with the IEEE 802.11ax standard. For example, in an HEW transmission, the signal field, HE-SIG may be composed of two symbols, HE-SIG1 and HE-SIG2, which are orthogonal to each other. The mere fact that these symbols are orthogonal to each other allows HEW computing devices to defer computing devices that follow, at least, the IEEE 802.11a/g, and the IEEE 802.11n standards. If the SCM 255 determines that the symbols included in the signal fields of the PHY preamble do not match the orientation as represented in the BPSK constellation map, the SCM 255 may determine that the signal transmission packet may have been an IEEE 802.11n transmission (block 510).

If the SCM 255 determines that the orientation of the symbols match those of HEW symbols as represented in the BPSK constellation map, then the SCM 255 may determine that the signal transmission packet may be an 802.11ac or an HEW transmission. The orientation of the one or more symbols may not be sufficient to defer IEEE 802.11ac transmissions because the IEEE 802.11ac standard may include the corresponding signal fields and symbols (e.g., VHT-SIG-A1 and VHT-SIG-A2) that may have the same orientation as the HE-SIG1 and HE-SIG2 symbols of the HEW standard.

At block 514, the SCM 255 may determine whether the length field is divisible by three or not. The IEEE 802.11ac standard requires that the length in the L-SIG be divisible by three. The SCM 255 may leverage that requirement in order to differentiate between the IEEE 802.11ac systems and the IEEE 802.11ax. If the SCM 255 determines that the length field is divisible by three, then the SCM 255 may determine that the received signal transmission packet is an IEEE 802.11ac packet and may defer decoding of the packet for at least a duration equal to the length field (block 516). If the SCM 255 determines that the length field in the L-SIG is not divisible by three, the SCM 255 may determine that the transmission signal is an HEW transmission (block 518). In that case, the SCM 255 may continue decoding the data packets associated with the transmission signal.

Figure 6:
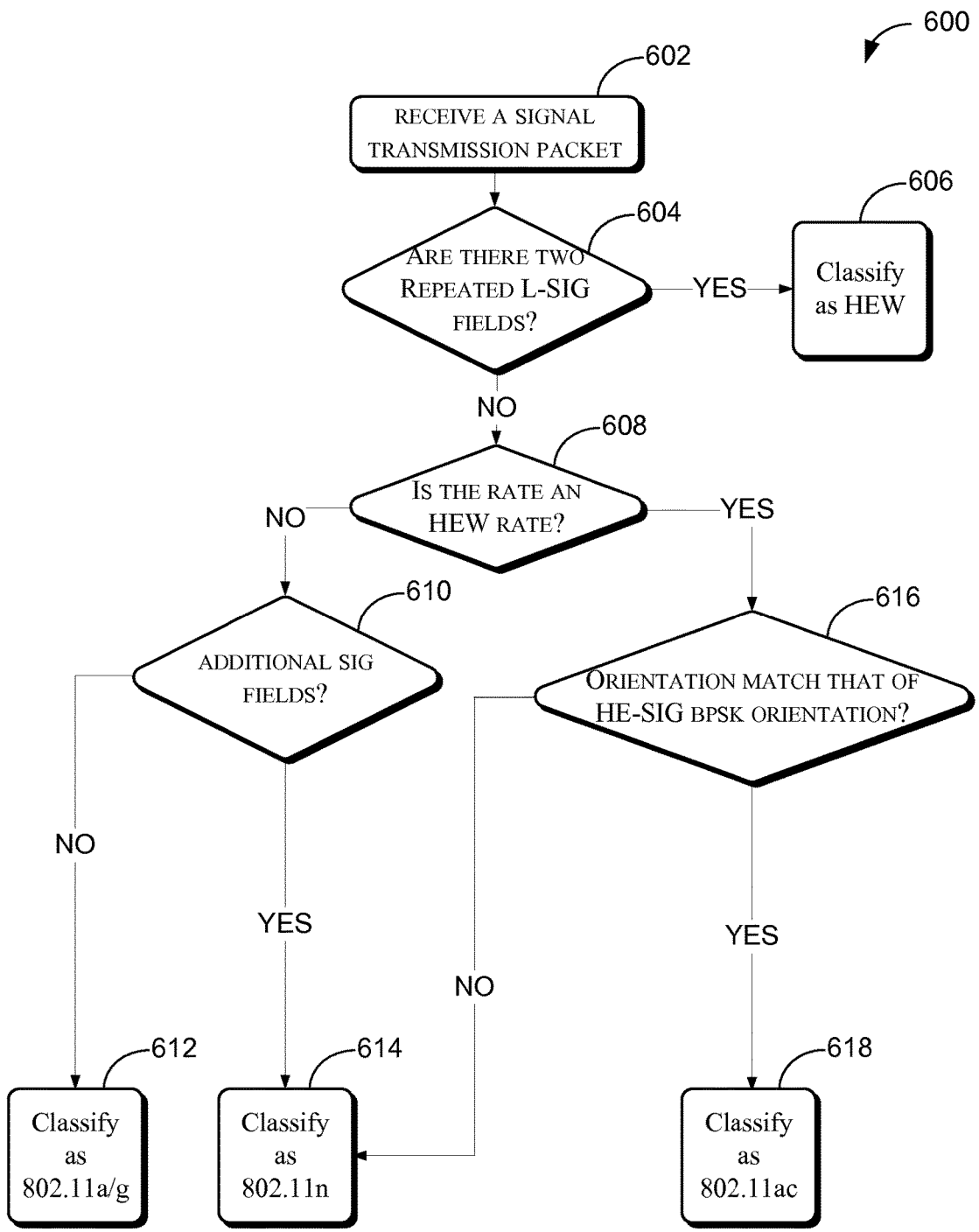
FIG. 6 is a flowchart that illustrates an example process of a signal classification module ("SCM") in according with one or more embodiments.

FIG. 6 is a flowchart that illustrates an example process 600 of an SCM 255 in accordance with one or more embodiments. The process 600 may generally include receiving by the SCM 255 a signal transmission packet having a PHY preamble (block 602) and determining whether a repeated legacy signal (L-SIG) is included in the received signal transmission (block 604). For instance, the process 600 may include determining by the SCM 255 whether a first L-SIG and a second L-SIG fields are included in the PHY preamble, where the second L-SIG is a repeat of the first L-SIG field. If the SCM 255 determines the existence of a repeated L-SIG is included in the PHY preamble, the process 600 may proceed to classify, by the SCM 255, the received signal transmission packet as an HEW transmission (block 606) because the previous IEEE 802.11 standards may not expect a repeated L-SIG in the PHY preamble.

At block 608, if there were no repeated L-SIG in the PHY preamble, the process 600 may determine by the SCM 255 whether the rate included in the L-SIG field is an HEW rate. If not, the process 600 may determine by the SCM 255 that the signal transmission packet is either an IEEE 802.11a/g or an IEEE 802.11n transmission because the rates of these standards may not be the same as the HEW rate. In that case, the process 600 may proceed to determining by the SCM 255 whether there are additional SIG fields included in the PHY preamble (block 610). If not, then the process 600 may classify by the SCM 255 that the received signal transmission packet as an IEEE 802.11a/g transmission (block 612). However, if the process 600 determines that there are additional SIG fields included in the PHY preamble, the process 600 may classify by the SCM 255 that the signal transmission packet as an IEEE 802.11n transmission (block 614). If at block 608, the process 600 determines by the SCM 255 that the rate field is one that is associated with an HEW rate, then the process 600 may proceed to determining by the SCM 255 the orientation of the SIG fields included in the PHY preamble (block 616). If the orientation of the SIG fields do not match the HE-SIG BPSK orientation, the process 600 may classify by the SCM 255 the received signal transmission packet as an IEEE 802.11n transmission (block 614), even though the rate was determined to be an HEW rate because of possible error in the received rate. If the process 600 determines that the orientation of the SIG fields included in the PHY preamble of the received signal transmission packet do match those of an HE-SIG BPSK orientation, the process 600 may classify the received signal transmission packet as an IEEE 802.11ac transmission (block 618). Consequently, the process 600 may defer decoding by the SCM 255 the rest of the signal transmission packet for a duration equal to that of the length field of the L-SIG.

In example embodiments of the disclosure, there may be a method for signal transmission classification on a transmission channel. The method may include receiving, by a computing device including one or more processors and one or more transceiver components, a signal transmission packet including a physical layer (PHY) preamble. The method may include identifying, by the computing device, within the PHY preamble, one or more signal (SIG) fields, wherein at least one of the one or more SIG fields includes at least a length field indicating a length of the signal transmission packet. The method may include determining, by the computing device, based at least in part on the length field, that the signal transmission packet is associated with a predetermined communication standard utilized to transmit the signal transmission packet. The method may include decoding, by the computing device, the signal transmission packet based at least in part on the determination that the signal transmission packet is associated with the predetermined communication standard. The predetermined communication standard may be an HEW standard and the length field may not be divisible by three. The method may further include determining, by the computing device, the signal transmission packet is intended for the computing device based on the decoded signal transmission packet. Determining that the signal transmission packet is associated with a predetermined communication standard may include examining a transmission rate included in the one or more SIG fields. Determining that the signal transmission packet is associated with a predetermined communication standard may include examining an orientation of the one or more SIG fields. The one or more SIG fields may include at least one of a Legacy Signal (L-SIG) field and a High-Efficiency Signal (HE-SIG) field. The length field and a rate field may be included in the L-SIG field of the PHY preamble. Decoding may include determining that the signal transmission packet is intended for the computing device based on the one or more SIG fields.

According to example embodiments of the disclosure, there may be a computing device. The computing device may include a transceiver configured to transmit and receive wireless signals, an antenna coupled to the transceiver, one or more processors in communication with the transceiver, at least one memory that stores computer-executable instructions, and at least one processor of the one or more processors configured to access the at least one memory. The at least one processor of the one or more processors may be configured to execute the computer-executable instructions to receive a signal transmission packet including a physical layer (PHY) preamble. The at least one processor may be configured, in response to execution of the instructions, to identify within the PHY preamble, one or more SIG fields associated with a predetermined communication standard utilized to transmit the signal transmission packet, wherein at least one of the one or more SIG fields includes at least a length field indicating a length of the signal transmission packet. The at least one processor may be configured, in response to execution of the instructions, to determine based at least in part on the length field, that the signal transmission packet is associated with the communication standard. The at least one processor may be configured, in response to execution of the instructions, to decode the signal transmission packet based at least in part on the determination that the signal transmission packet is associated with the predetermined communication standard. The predetermined communication standard may be an HEW standard and the length field may not be divisible by three. The at least one processor may be further configured, in response to execution of the instructions, to determine the signal transmission packet is intended for the computing device. The at least one processor may be further configured, in response to execution of the instructions, to examine a transmission rate included in the one or more SIG fields. The at least one processor may be further configured, in response to execution of the instructions, to include examining an orientation of the one or more SIG fields. The one or more SIG fields may include at least one of a Legacy Signal (L-SIG) field and a High-Efficiency Signal (HE-SIG) field. The length field and a rate field may be included in the L-SIG field of the PHY preamble.

In example embodiments of the disclosure, there may be a computer-readable medium storing computer-executable instructions which, when executed by a processor, cause the processor to perform operations. The operations may include receiving a signal transmission packet including a physical layer (PHY) preamble, following a communication standard, from a second computing device. The operations may include determining a first legacy signal (L-SIG) field included with the signal transmission packet. The operations may include determining a second L-SIG field included with the signal transmission packet, wherein the second L-SIG is associated with the first L-SIG field. The operations may include processing the signal transmission packet based on determining the second L-SIG field is included with the signal transmission packet. The one or more SIG fields may include at least one of a Legacy Signal (L-SIG) field and a High-Efficiency Signal (HE-SIG) field. The second L-SIG field may be a repeat of the first L-SIG field. Processing may include decoding the signal transmission packet in accordance with a communication standard. The first L-SIG may include a first rate and a first length, and the second L-SIG may include a second rate and a second length, wherein the first rate may be associated with the second rate and the first length may be associated with the second L-SIG. The operations may further include determining, by the first computing device, the signal transmission packet is intended for the first computing device.

In example embodiments of the disclosure, there may be a signal transmission classification on a transmission channel system. The system may include at least one memory that store computer-executable instructions, and at least one processor configured to access the at least one memory, wherein the at least one processor may be configured to execute the computer-executable instructions to receive a signal transmission packet including a physical layer (PHY) preamble. The at least one processor may be configured to execute the computer-executable instructions to identify within the PHY preamble, one or more signal (SIG) fields, wherein at least one of the one or more SIG fields includes at least a length field indicating a length of the signal transmission packet. The at least one processor may be configured to execute the computer-executable instructions to determine based at least in part on the length field, that the signal transmission packet is associated with a predetermined communication standard utilized to transmit the signal transmission packet. The at least one processor may be configured to execute the computer-executable instructions to decode the signal transmission packet based at least in part on the determination that the signal transmission packet is associated with the predetermined communication standard. The predetermined communication standard may be an HEW standard and the length field may not be divisible by three. The at least one processor may be further configured to execute the computer-executable instructions to determine the signal transmission packet is intended for the computing device based on the decoded signal transmission packet. Determining that the signal transmission packet is associated with a predetermined communication standard may include examining a transmission rate included in the one or more SIG fields. Determining that the signal transmission packet is associated with a predetermined communication standard may include examining an orientation of the one or more SIG fields. The one or more SIG fields may include at least one of a Legacy Signal (L-SIG) field and a High-Efficiency Signal (HE-SIG) field. The length field and a rate field may be included in the L-SIG field of the PHY preamble. Decoding may include determining that the signal transmission packet is intended for the computing device based on the one or more SIG fields.

In example embodiments of the disclosure, there may be a signal transmission classification on a transmission channel apparatus. The apparatus may include receiving, by a computing device including one or more processors and one or more transceiver components, a signal transmission packet including a physical layer (PHY) preamble. The apparatus may include identifying, by the computing device, within the PHY preamble, one or more signal (SIG) fields, wherein at least one of the one or more SIG fields includes at least a length field indicating a length of the signal transmission packet. The apparatus may include determining, by the computing device, based at least in part on the length field, that the signal transmission packet is associated with a predetermined communication standard utilized to transmit the signal transmission packet. The apparatus may include decoding, by the computing device, the signal transmission packet based at least in part on the determination that the signal transmission packet is associated with the predetermined communication standard. The predetermined communication standard may be an HEW standard and the length field may not be divisible by three. The apparatus may further include determining, by the computing device, the signal transmission packet is intended for the computing device based on the decoded signal transmission packet. Determining that the signal transmission packet is associated with a predetermined communication standard may include examining a transmission rate included in the one or more SIG fields. Determining that the signal transmission packet is associated with a predetermined communication standard may include examining an orientation of the one or more SIG fields. The one or more SIG fields may include at least one of a Legacy Signal (L-SIG) field and a High-Efficiency Signal (HE-SIG) field. The length field and a rate field may be included in the L-SIG field of the PHY preamble. Decoding may include determining that the signal transmission packet is intended for the computing device based on the one or more SIG fields.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A wireless apparatus, comprising:
   at least one memory storing computer-executable instructions; and
   at least one processor to access the at least one memory, wherein the at least one processor is to execute the computer-executable instructions to:
   cause wireless transmission of a high efficiency (HE) packet having a physical layer (PHY) preamble, the PHY preamble including a legacy short training field (L-STF), a legacy long training field (L-LTF) immediately following the L-STF, a legacy signal field (L-SIG) immediately following the L-LTF, a repeated signal field (RL-SIG) immediately following the L-SIG, a high efficiency signal field (HE-SIG) immediately following the RL-SIG, a high efficiency short training field (HE-STF) immediately following the HE-SIG, a high efficiency long training field (HE-LTF) immediately following the HE-STF, wherein:
   the L-SIG includes a rate field and a length field;
   the HE-SIG includes a first high efficiency signal symbol (HE-SIG-1) and a second high efficiency signal symbol (HE-SIG-2); and
   the RL-SIG is a repetition of the L-SIG; and
   set a value of the length field of the L-SIG such that the value of the length field is not divisible by three, wherein the repetition and the value of the length field not being divisible by three are to indicate that the packet is a HE packet.

2. The apparatus of claim 1, wherein the HE-SIG-1 and the HE-SIG-2 exhibit a mapping onto a binary phase shift keying (BPSK) constellation.

3. The apparatus of claim 2, wherein the HE-SIG-1 and the HE-SIG-2 exhibit a mapping onto a binary phase shift keying (BPSK) constellation such that the HE-SIG-1 and the HE-SIG-2 present a phase rotation of 90 degrees with respect to one another.

4. The apparatus of claim 2, further including hardware to map the HE-SIG-1 and the HE-SIG-2 onto a binary phase shift keying (BPSK) constellation.

5. The apparatus of claim 1, wherein the HE-SIG consists of HE-SIG-1 and HE-SIG-2.

6. The apparatus of claim 1, wherein the HE-LTF includes one, two or eight HE-LTFs.

7. The apparatus of claim 6, wherein each HE-LTF of the one or two HE-LTFs has a duration of 4 μs.

8. The apparatus of claim 1, further comprising a transceiver to transmit or receive packets using radio frequency signals, the transceiver to include a low-noise amplifier and an analog-to-digital converter.

9. The apparatus of claim 8, further including a memory to store one or more operating systems.

10. The apparatus of claim 9, further including one or more antennas coupled to the transceiver, the antennas including MIMO antennas.

11. A non-transitory computer-readable medium storing computer-executable instructions which, when executed by a processor, cause the processor to perform operations comprising:
    causing wireless transmission of a high efficiency (HE) packet having a physical layer (PHY) preamble, the PHY preamble including a legacy short training field (L-STF), a legacy long training field (L-LTF) immediately following the L-STF, a legacy signal field (L-SIG) immediately following the L-LTF, a repeated signal field (RL-SIG) immediately following L-SIG, a high efficiency signal field (HE-SIG) immediately following RL-SIG, a high efficiency short training field (HE-STF)

immediately following the HE-SIG, a high efficiency long training field (HE-LTF) immediately following the HE-STF, wherein:
the L-SIG includes a rate field and a length field;
the HE-SIG consists includes a first high efficiency signal symbol (HE-SIG-1) and a second high efficiency signal symbol (HE-SIG-2); and
the RL-SIG is a repetition of the L-SIG; and
setting a value of the length field of the L-SIG such that the value of the length field is not divisible by three, wherein the repetition and the value of the length field not being divisible by three are to indicate that the packet is a HE packet.

12. The non-transitory computer-readable medium of claim 11, wherein the operations include mapping the HE-SIG-1 and the HE-SIG-2 onto a binary phase shift keying (BPSK) constellation.

13. The non-transitory computer-readable medium of claim 12, wherein the operations include mapping the HE-SIG-1 and the HE-SIG-2 onto a binary phase shift keying (BPSK) constellation such that the HE-SIG-1 and the HE-SIG-2 present a phase rotation of 90 degrees with respect to one another.

14. The non-transitory computer-readable medium of claim 11, wherein the HE-SIG consists of the HE-SIG-1 and the HE-SIG-2.

15. The non-transitory computer-readable medium of claim 11, wherein HE-LTF includes one, two or eight HE-LTFs, and wherein each HE-LTF of the one or two HE-LTFs has a duration of 4 µs.

16. A method to operate a wireless apparatus, the method comprising:
causing wireless transmission of a high efficiency (HE) packet having a physical layer (PHY) preamble, the PHY preamble including a legacy short training field (L-STF), a legacy long training field (L-LTF) immediately following the L-STF, a legacy signal field (L-SIG) immediately following the L-LTF, a repeated signal field (RL-SIG) immediately following the L-SIG, a high efficiency signal field (HE-SIG) immediately following the RL-SIG, a high efficiency short training field (HE-STF) immediately following the HE-SIG, a high efficiency long training field (HE-LTF) immediately following the HE-STF, wherein:
the L-SIG includes a rate field and a length field;
the HE-SIG consists includes a first high efficiency signal symbol (HE-SIG-1) and a second high efficiency signal symbol (HE-SIG-2); and
the RL-SIG is a repetition of the L-SIG; and
setting a value of the length field of the L-SIG such that the value of the length field is not divisible by three, wherein the repetition and the value of the length field not being divisible by three are to indicate that the packet is a HE packet.

17. The method of claim 16, further including mapping the HE-SIG-1 and the HE-SIG-2 onto a binary phase shift keying (BPSK) constellation.

18. The method of claim 17, further including mapping the HE-SIG-1 and the HE-SIG-2 onto a binary phase shift keying (BPSK) constellation such that the HE-SIG-1 and the HE-SIG-2 present a phase rotation of 90 degrees with respect to one another.

19. The method of claim 16, wherein the HE-SIG consists of the HE-SIG-1 and the HE-SIG-2.

20. The method of claim 16, wherein the HE-LTF includes one, two or eight HE-LTFs, and wherein each HE-LTF of the one or two HE-LTFs has a duration of 4 µs.

21. A wireless apparatus, comprising:
at least one memory storing computer-executable instructions; and
at least one processor to access the at least one memory, wherein the at least one processor is to execute the computer-executable instructions to:
receive a high efficiency (HE) packet having a physical layer (PHY) preamble, the PHY preamble including a legacy short training field (L-STF), a legacy long training field (L-LTF) immediately following the L-STF, a legacy signal field (L-SIG) immediately following the L-LTF, a repeated signal field (RL-SIG) immediately following the L-SIG, a high efficiency signal field (HE-SIG) immediately following the RL-SIG, a high efficiency short training field (HE-STF) immediately following the HE-SIG, a high efficiency long training field (HE-LTF) immediately following the HE-STF, wherein:
the L-SIG includes a rate field and a length field;
the HE-SIG includes a first high efficiency signal symbol (HE-SIG-1) and a second high efficiency signal symbol (HE-SIG-2);
the RL-SIG is a repetition of the L-SIG; and
a value of the length field of the L-SIG is not divisible by three;
identify the packet as a HE packet based on determining the repetition and based on determining that the value of the length field is not divisible by three.

22. The apparatus of claim 21, wherein the at least one processor is to execute the computer-executable instructions to demodulate the HE-SIG-1 and the HE-SIG-2, and wherein the HE-SIG1 and the HE-SIG-2 exhibit a mapping onto a binary phase shift keying (BPSK) constellation.

23. The apparatus of claim 22, wherein the HE-SIG-1 and the HE-SIG-2 present a phase rotation of 90 degrees with respect to one another.

24. The apparatus of claim 21, wherein the at least one processor is to execute the computer-executable instructions to demodulate the HE-SIG-1 and the HE-SIG-2, and wherein the HE-SIG consists of the HE-SIG-1 and the HE-SIG-2.

25. The apparatus of claim 21, wherein:
the at least one processor is to execute the computer-executable instructions to demodulate the HE-LTF; and
the HE-LTF includes one, two or eight HE-LTFs, each HE-LTF of the one or two HE-LTFs having a duration of 4 µs.

26. The apparatus of claim 21, further comprising:
a transceiver to transmit or receive packets using radio frequency signals, the transceiver to include a low-noise amplifier and an analog-to-digital converter; and
a memory to store one or more operating systems.

27. The apparatus of claim 26, further including one or more antennas coupled to the transceiver, the antennas including MIMO antennas.

28. A non-transitory computer-readable medium storing computer-executable instructions which, when executed by a processor, cause the processor to perform operations comprising:
receiving a high efficiency (HE) packet having a physical layer (PHY) preamble, the PHY preamble including a legacy short training field (L-STF), a legacy long training field (L-LTF) immediately following the L-STF, a legacy signal field (L-SIG) immediately following the L-LTF, a repeated signal field (RL-SIG) immediately following the L-SIG, a high efficiency signal field (HE-SIG) immediately following the RL- SIG, a high efficiency short training field (HE-STF) immediately following the HE-SIG, a high efficiency long training field (HE-LTF) immediately following the HE-STF, wherein:
the L-SIG includes a rate field and a length field;
the HE-SIG includes a first high efficiency signal symbol (HE-SIG-1) and a second high efficiency signal symbol (HE-SIG-2);
the RL-SIG is a repetition of the L-SIG; and
a value of the length field of the L-SIG is not divisible by three;
identifying the packet as a HE packet based on determining the repetition and based on determining that the value of the length field is not divisible by three.

29. The non-transitory computer-readable medium of claim 28, the operations further including demodulating the HE-SIG-1 and the HE-SIG-2, wherein the HE-SIG1 and the HE-SIG-2 are mapped onto a binary phase shift keying (BPSK) constellation.

30. The non-transitory computer-readable medium of claim 29, wherein the HE-SIG-1 and the HE-SIG-2 present a phase rotation of 90 degrees with respect to one another.

31. The non-transitory computer-readable medium of claim 28, the operations further including demodulating the HE-SIG-1 and the HE-SIG-2, wherein the HE-SIG consists of the HE-SIG-1 and the HE-SIG-2.

32. The non-transitory computer-readable medium of claim 28, the operations further including demodulating the HE-LTF, wherein the HE-LTF includes one, two or eight HE-LTFs, and wherein each HE-LTF of the one or two HE-LTFs has a duration of 4 µs.

33. A method of operating a wireless apparatus, the method including:
receiving a high efficiency (HE) packet having a physical layer (PHY) preamble, the PHY preamble including a legacy short training field (L-STF), a legacy long training field (L-LTF) immediately following the L-STF, a legacy signal field (L-SIG) immediately following the L-LTF, a repeated signal field (RL-SIG) immediately following the L-SIG, a high efficiency signal field (HE-SIG) immediately following the RL-SIG, a high efficiency short training field (HE-STF) immediately following the HE-SIG, a high efficiency long training field (HE-LTF) immediately following the HE-STF, wherein:
the L-SIG includes a rate field and a length field;
the HE-SIG includes a first high efficiency signal symbol (HE-SIG-1) and a second high efficiency signal symbol (HE-SIG-2);
the RL-SIG is a repetition of the L-SIG; and
a value of the length field of the L-SIG is not divisible by three;
identifying the packet as a HE packet based on determining the repetition and based on determining that the value of the length field is not divisible by three.

34. The method of claim 33, further including demodulating the HE-SIG-1 and the HE-SIG-2, wherein the HE-SIG1 and the HE-SIG-2 are mapped onto a binary phase shift keying (BPSK) constellation.

35. The method of claim 34, wherein the HE-SIG-1 and the HE-SIG-2 present a phase rotation of 90 degrees with respect to one another.

36. The method of claim 33, further including demodulating the HE-SIG-1 and the HE-SIG-2, wherein the HE-SIG consists of the HE-SIG-1 and the HE-SIG-2.

37. The method of claim 33, further including demodulating the HE-LTF, wherein the HE-LTF includes one, two or eight HE-LTFs.

38. The method of claim 37, wherein each HE-LTF of the one or two HE-LTFs has a duration of 4 µs.

* * * * *